(12) United States Patent
Yan et al.

(10) Patent No.: US 9,106,339 B2
(45) Date of Patent: Aug. 11, 2015

(54) COEFFICIENT DETERMINING APPARATUS, EQUALIZER, RECEIVER AND TRANSMITTER

(71) Applicant: FUJITSU LIMITED, Kawasaki-shi, Kanagawa (JP)

(72) Inventors: Meng Yan, Beijing (CN); Zhenning Tao, Beijing (CN); Lei Li, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 14/026,351

(22) Filed: Sep. 13, 2013

(65) Prior Publication Data

US 2014/0079408 A1 Mar. 20, 2014

(30) Foreign Application Priority Data

Sep. 14, 2012 (CN) .......................... 2012 1 0343013

(51) Int. Cl.
| | |
|---|---|
| H04B 10/00 | (2013.01) |
| H04B 10/2507 | (2013.01) |
| H04L 7/04 | (2006.01) |
| H04L 25/03 | (2006.01) |
| H04L 27/00 | (2006.01) |

(52) U.S. Cl.
CPC ............ *H04B 10/2507* (2013.01); *H04L 7/042* (2013.01); *H04L 25/03006* (2013.01); *H04L 2027/0026* (2013.01)

(58) Field of Classification Search
USPC .................................................. 398/202–214
See application file for complete search history.

(56) References Cited

U.S. PATENT DOCUMENTS

| | | | | | |
|---|---|---|---|---|---|
| 5,481,564 | A  * | 1/1996 | Kakuishi et al. | ............... | 375/230 |
| 6,275,525 | B1 * | 8/2001 | Bahai et al. | ................... | 375/232 |
| 6,618,452 | B1 * | 9/2003 | Huber et al. | .................. | 375/343 |
| 8,009,766 | B2 * | 8/2011 | Kim et al. | ...................... | 375/316 |
| 8,238,318 | B1 * | 8/2012 | Negus | ........................... | 370/338 |
| 8,411,767 | B2 * | 4/2013 | Alexander et al. | ............ | 375/260 |
| 2004/0120274 | A1 * | 6/2004 | Petre et al. | ..................... | 370/320 |
| 2004/0141548 | A1 * | 7/2004 | Shattil | ............................ | 375/146 |
| 2005/0047802 | A1 * | 3/2005 | Jaynes et al. | .................. | 398/208 |

(Continued)

OTHER PUBLICATIONS

Partial European Search Report mailed Feb. 5, 2014 in corresponding European Application No. 13184538.0.

(Continued)

*Primary Examiner* — Agustin Bello
(74) *Attorney, Agent, or Firm* — Staas & Halsey LLP

(57) ABSTRACT

Embodiments of the present invention provide a coefficient determining apparatus, equalizer, receiver and transmitter. The coefficient determining apparatus comprises: a synchronizer configured to find a position of a training sequence from signals containing the training sequence received by a transmitter; and a first processor configured to set an initial tap coefficient of an equalizer according to the received signals and the training sequence; wherein in each polarization state, the training sequence comprises n pairs of training symbols, in the n pairs of training symbols, the training symbols of the same pair being identical, the training symbols of the different pair being different, a cyclic prefix and a cyclic postfix being respectively inserted before and after each pair of training symbols, and n being an integer greater than 1. By using the training sequence contained in the transmitted signals to determine an initial tap coefficient of the equalizer relatively close to the optimal value, channel damages may be approximately compensated, and the receiver is facilitated in further processing the signals.

6 Claims, 10 Drawing Sheets

(56) References Cited

U.S. PATENT DOCUMENTS

| | | |
|---|---|---|
| 2005/0196176 A1* | 9/2005 | Sun et al. .................... 398/152 |
| 2005/0276340 A1 | 12/2005 | Chow et al. |
| 2009/0304128 A1 | 12/2009 | Izumi et al. |
| 2010/0315940 A1* | 12/2010 | Chen et al. ................... 370/210 |
| 2011/0002689 A1* | 1/2011 | Sano et al. .................... 398/44 |
| 2011/0096855 A1* | 4/2011 | Youn et al. .................... 375/260 |
| 2012/0134684 A1* | 5/2012 | Koizumi et al. ............. 398/202 |
| 2013/0039406 A1* | 2/2013 | Torin et al. ................... 375/232 |
| 2013/0216239 A1* | 8/2013 | Zhang et al. .................. 398/202 |
| 2013/0272719 A1* | 10/2013 | Yan et al. ..................... 398/159 |
| 2014/0079408 A1* | 3/2014 | Yan et al. ..................... 398/152 |

OTHER PUBLICATIONS

Extended European Search Report dated May 21, 2014 in corresponding European Patent Application No. 13184538.0.

* cited by examiner

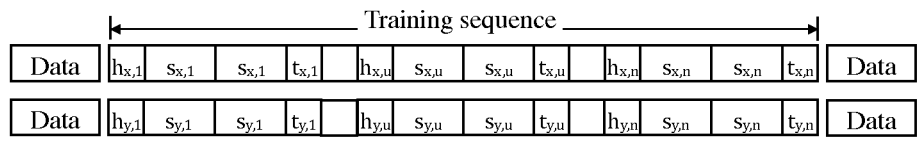
FIG.4
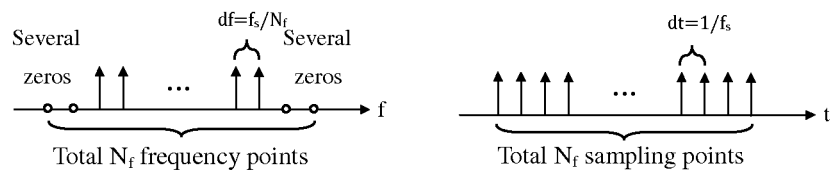
FIG.5A                                FIG.5B
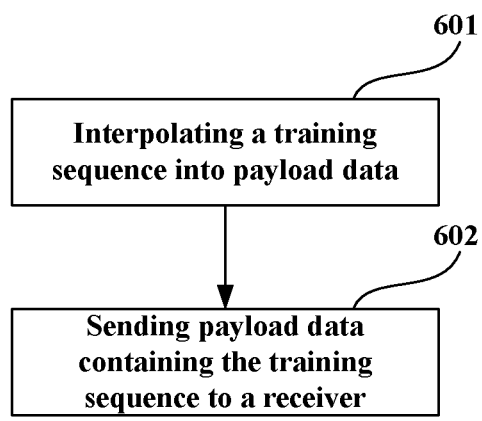
FIG.6

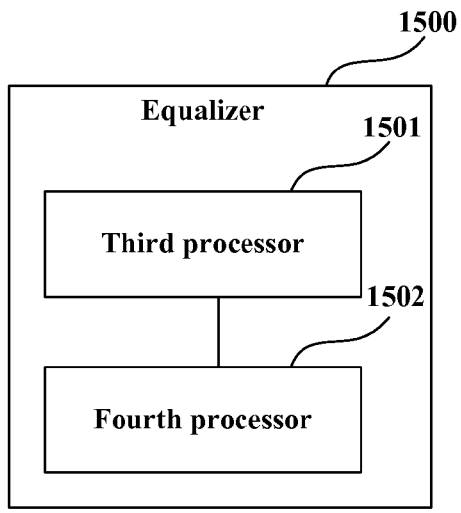
FIG.15
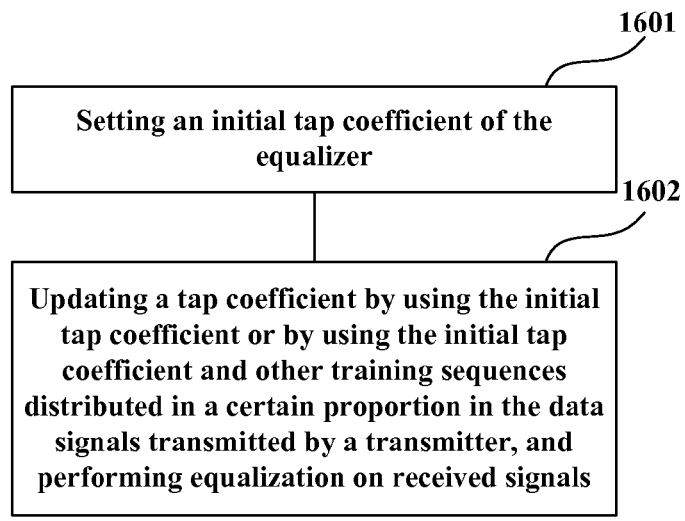
FIG.16
Signals in x polarization state
| TS | Payload data | T | Payload data | T | ...... | T | Payload data | T | Payload data | ...... |
| TS | Payload data | T | Payload data | T | ...... | T | Payload data | T | Payload data | ...... |
Signals in y polarization state
FIG.17

US 9,106,339 B2

COEFFICIENT DETERMINING APPARATUS, EQUALIZER, RECEIVER AND TRANSMITTER

CROSS-REFERENCE TO RELATED APPLICATIONS

This application claims the foreign priority benefit of Chinese Patent Application No. 201210343013.X, filed Sep. 14, 2012, the contents of which are incorporated herein by reference.

TECHNICAL FIELD

The present invention relates to the field of optical communications, and in particular to a coefficient determining apparatus, equalizer, receiver and transmitter.

BACKGROUND ART

FIG. 1 is a schematic diagram of the structure of a coherent optical communication system. As show in FIG. 1, in the coherent optical communication system, optical signals are transmitted from the transmitting end to the receiving end via optical channels. Dispersion in the optical fiber and polarization mode dispersion will induce inter-symbol interference (ISI). In order to compensate for the ISI induced by the optical channels, equalization is generally used in the receiver. The equalization may be divided into two steps: the first step is static equalization for compensating for the damages that are induced by the optical channels and do not vary along with the time (such as accumulated dispersion), and the second step is adaptive equalization (AEQ) for compensating for the residual dispersion and the damages varying along with the time (such as polarization scattering and polarization mode dispersion). An adaptive equalizer is generally realized by a finite impulse response (FIR) filter. In a dual-polarization system, a butterfly FIR filter is used as an equalizer.

FIG. 2 is a schematic diagram of the structure of a butterfly FIR filter. As show in FIG. 2, the FIR tap coefficients are denoted by vectors $w_{xx}$, $w_{yx}$, $w_{xy}$ and $w_{yy}$, and the relations between the input and output of the equalizer are as shown by formulae (1x) and (1y):

$$s_x = w_{xx} \otimes r_x + w_{yx} \otimes r_y \quad (1x)$$

$$s_y = w_{xy} \otimes r_x + w_{yy} \otimes r_y; \quad (1y)$$

where, $\otimes$ denotes a convolution operation, r is an input signal of the equalizer, s is an output signal of the equalizer, and the two subscripts x, y denote two polarization modes.

Currently, there are mainly two conventional adaptive equalization methods: a constant modulus algorithm (CMA) and a decision-assisted minimal mean square error (MMSE) algorithm, in both of which an initial tap coefficient (weight) is set first for the FIR filter, and then the tap coefficient is iteratively updated according to a certain cost function, making it converged to an optimal value. However, any information on related channels is not used in setting an initial tap coefficient for the FIR filter, which may be much different from the optimal value, and need a relatively long converged procedure in reaching the optimal value.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

Embodiments of the present invention provide a coefficient determining apparatus, equalizer, receiver, transmitter and a method thereof, in which a training sequence set in a transmitted signal is used to determine an equalizer initial tap coefficient relatively close to an optimal value, so as to approximately compensate for signal damages, and facilitate the receiver in further processing the signals.

According to one aspect of the embodiments of the present invention, there is provided a coefficient determining apparatus, comprising:

a synchronizer configured to find a position of a training sequence from signals containing the training sequence received by a transmitter; and a first processor configured to set an initial tap coefficient of an equalizer according to the received signals and the training sequence;

wherein in each polarization state, the training sequence comprises n pairs of training symbols, in the n pairs of training symbols, the training symbols of the same pair being identical, the training symbols of the different pair being different, a cyclic prefix and a cyclic postfix being respectively inserted before and after each pair of training symbols, and n being an integer greater than 1.

In the coefficient determining apparatus, in determining the initial tap coefficient, the signals containing the training sequence transmitted by the transmitter are received, the position of the training sequence in the received signals are found, and then the initial tap coefficient of the equalizer is set according to the received signals and the training sequence, thereby determining an initial tap coefficient relatively close to an optimal value, approximately compensating for signal damages, and facilitating the receiver in further processing the signals.

According to another aspect of the embodiments of the present invention, there is provided an equalizer, comprising:

a third processor configured to determine an initial tap coefficient of the equalizer, the third processor being the coefficient determining apparatus as described above; and a fourth processor configured to update a tap coefficient by using the initial tap coefficient determined by the third processor or by using the initial tap coefficient and other training sequences distributed in a certain proportion in the data signals transmitted by a transmitter, and perform equalization on received signals.

In the equalizer, as the determined initial tap coefficient is close to the optimal value, most of the signal damages may be compensated for by directly using the determined initial tap coefficient to equalize the received signals; and the speed of convergence may be increased by using the determined initial tap coefficient to update the tap coefficient, making the coefficient to reach the optimal value quickly.

According to still another aspect of the embodiments of the present invention, there is provided a synchronizer, comprising:

a second correlation calculator configured to calculate correlation values of $N_f$ sampling values before and $N_f$ sampling values after n sections of sampling values with a length of $2 N_f$ in each polarization state starting from each sampling point, according to data signals containing a training sequence, a length $N_f$ of training symbols of the training sequence, the number of the training symbols and the lengths of a cyclic prefix and a cyclic postfix inserted before and after the training symbols; wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1;

a second modulus squarer configured to calculate a square of the moduli of the correlation values;

a second weighting averager configured to perform weighted average on a predefined sampling point serial number by using the square of the moduli of the correlation values in two polarization states, so as to obtain a starting position of the training sequence; wherein the predefined sampling point serial number refers to a sampling point serial number of the square of the moduli of the correlation values $\alpha$ times greater than a maximum square of the moduli of the correlation value, the range of $\alpha$ being between $(n-1)/n$ and 1; and a fifth processor configured to determine a position of the training sequence in the data signals, according to the starting position, the length of the training symbols and the lengths of the cyclic prefix and cyclic postfix.

In the above synchronizer, correlation values of $N_f$ sampling values before and $N_f$ sampling values after n sections of sampling values with a length of 2 $N_f$ in each polarization state starting from each sampling point are calculated first, according to a length $N_f$ of training symbols and the lengths of a cyclic prefix and a cyclic postfix inserted before and after the training symbols; a square of the moduli of the correlation values is calculated; weighted average is performed on a predefined sampling point serial number by using the square of the moduli of the correlation values in two polarization states, so as to obtain a starting position of the training sequence; and a position of the training sequence in the received signals is determined, according to the starting position and the length of the training sequence. As the above method and training sequence are used in the synchronization, the precision of the synchronization is increased.

According to further still another aspect of the embodiments of the present invention, there is provided a frequency difference compensator, comprising:

a third frequency difference estimator configured to calculate a first frequency difference by using a correlation value corresponding to a starting position of the training sequence in received data signals containing the training sequence, a length $N_f$ of training symbols of the training sequence and a sampling time interval; wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1;

a third frequency difference compensator configured to perform first frequency difference compensation on the received data signals by using the first frequency difference;

a third converter configured to convert the time domain signals to which the training sequence corresponds into a frequency domain;

a second power calculator configured to calculate the power of the training sequence at each frequency point;

a fourth frequency difference estimator configured to calculate a second frequency difference by using the calculated power, a position of a frequency point padded with data and a position of a frequency point padded with zero in the frequency spectrum of the training sequence; and a fourth frequency difference compensator configured to, according to the second frequency difference, perform second frequency difference compensation on the signals on which the first frequency difference compensation has been performed.

In the above frequency difference compensator, the first frequency difference is calculated by using the length of the training symbols and a sampling time interval; the time domain signals to which the training sequence corresponds is converted into a frequency domain; the power of the training sequence at each frequency point after the first frequency difference compensation is calculated; a second frequency difference is calculated according to the calculated power, positions of frequency point padded with data and positions of frequency point padded with zero in the frequency spectrum of the training sequence; and frequency difference compensation is performed on the received signals by using respectively the first frequency difference and the second frequency difference. As the training sequence containing n pairs of training symbols is used, the precision of the frequency difference estimation is increased.

According to further still another aspect of the embodiments of the present invention, there is provided a receiver, comprising the coefficient determining apparatus, or the equalizer, or the synchronize, or the frequency difference compensator, as described above.

According to further still another aspect of the embodiments of the present invention, there is provided a transmitter, comprising:

a sixth processor configured to insert a training sequence into payload data; and a sender configured to send payload data containing the training sequence to a receiver;

wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1.

In this transmitter, a training sequence is inserted into payload data; and data signals containing the training sequence are sent to a receiver. In this way, the receiver may perform synchronization, frequency difference estimation, compensation and equalization by using the training sequence.

It can be seen from the above embodiment that the receiver is facilitated to further process signals by determining an initial tap coefficient relatively close to the optimal value by using the training sequence set in the transmitted signals.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 4 is a schematic diagram of the structure of the training sequence of an embodiment of the present invention;

FIG. 5A is a schematic diagram of the training sequence in a frequency domain;

FIG. 5B is a schematic diagram of the training sequence in a time domain;

FIG. 6 is a flowchart of transmitting data of Embodiment 1 of the present invention;

FIG. 15 is a schematic diagram of the structure of the equalizer of Embodiment 4 of the present invention;

FIG. 16 is a flowchart of the equalizing method of Embodiment 4 of the present invention;

FIG. 17 is a schematic diagram of training sequences T and TS in the time domain;

DETAILED DESCRIPTION OF THE INVENTION

Various embodiments of the present invention shall be described below with reference to the drawings. Such embodiments are exemplary only, and are not intended to limit the present invention. For easy understanding of the principle and embodiments of the present invention by those skilled in the art, the embodiments of the present invention shall be described taking determination of an initial tap coefficient of an equalizer in a coherent optical communication system as an example. However, it should be noted that the embodiments of the present invention are applicable to all the communication systems in which coefficients are determined.

Embodiment 1

Figure 3:
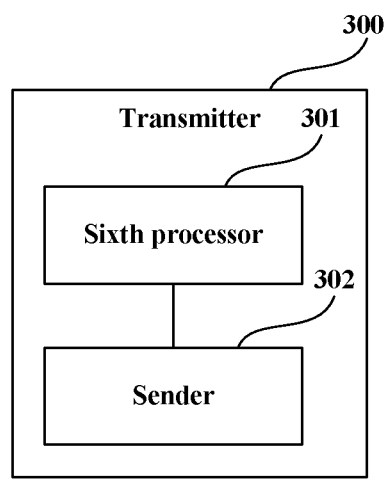
FIG. 3 is a schematic diagram of the structure of the transmitter of Embodiment 1 of the present invention.

FIG. 3 is a schematic diagram of the structure of the transmitter of Embodiment 1 of the present invention. As shown in FIG. 3, the transmitter 300 comprises a sixth processor 301 and a sender 302; wherein, the sixth processor 301 is configured to insert a training sequence (TS) into payload data, and the sender 302 is configured to send payload data containing the training sequence to a receiver;

wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1.

It can be seen from the above embodiment that synchronization, frequency difference estimation, compensation and setting of an initial tap coefficient of an equalizer may be performed with the training sequence inserted into the payload data by the transmitter, with the accuracy of calculation of a synchronization position being increased in synchronizing, the precision of frequency difference estimation being increased in estimating frequency difference, and making the initial tap coefficient to be close to the optimal value in setting the initial tap coefficient.

In this embodiment, as the sampling signals may be expressed by discrete sampling values, the training sequence TS may be expressed in forms of (2x) and (2y) in the time domain:

$$h_{x,1}s_{x,1}s_{x,1}t_{x,1} \ldots h_{x,u}s_{x,u}s_{x,u}t_{x,u} \ldots h_{x,v}s_{x,v}s_{x,v}t_{x,v} \ldots h_{x,n}s_{x,n}s_{x,n}t_{x,n} \quad (2x)$$

$$h_{y,1}s_{y,1}s_{y,1}t_{hd\ y,1} \ldots h_{y,u}s_{y,u}s_{y,u}t_{y,u} \ldots h_{y,v}s_{y,v}s_{y,v}t_{y,v} \ldots h_{y,n}s_{y,n}s_{y,n}t_{y,n} \quad (2y);$$

In this embodiment, subscripts x and y denote horizontal and vertical polarization states, respectively.

Formula (2x) denotes a discrete sampling value of the training sequence in the x polarization state, where, $s_{x,1}s_{x,1} \ldots s_{x,u}s_{x,u} \ldots s_{x,v}s_{x,v} \ldots s_{x,n}s_{x,n}$ are n pairs of training symbols, and in the n pairs of training symbols, each pair of training symbols $s_{x,u}s_{x,u}$ are identical, and different pairs of training symbols are different, that is, when $u \neq v$, $s_{x,u}s_{x,u}$ and $s_{x,v}s_{x,v}$ are different; $h_{x,1} \ldots h_{x,u} \ldots h_{x,v} \ldots h_{x,n}$ denote cyclic prefixes of each pair of training symbols inserted before each pair of training symbols, where, a u-th cyclic prefix $h_{x,u}$ is the last $L_{cp}$ values of the training symbol $s_{x,u}$; $t_{x,1} \ldots t_{x,u} \ldots t_{x,v} \ldots t_{x,n}$ denote cyclic postfixes of each pair of training symbols inserted after each pair of training symbols, where, a u-th cyclic postfix $t_{x,u}$ is the foremost $L_{cp}$ values of the training symbol $s_{x,u}$; $L_{cp}$ is the length of the cyclic prefix and cyclic postfix, and the values of u and v are integers taken from 1 to n.

Formula (2y) denotes a discrete sampling value of the training sequence in the y polarization state, where, $h_{y,1}s_{y,1}s_{y,1}t_{y,1} \ldots h_{y,u}s_{y,u}s_{y,u}t_{y,u} \ldots h_{y,v}s_{y,v}s_{y,v}t_{y,v} \ldots h_{y,n}s_{y,n}s_{y,n}t_{y,n}$ are n pairs of training symbols, and in the n pairs of training symbols, each pair of training symbols $s_{y,u}s_{y,u}$ are identical, and different pairs of training symbols are different, that is, when $u \neq v$, $s_{y,u}s_{y,u}$ and $s_{y,v}s_{y,v}$ are different; $h_{y,1} \ldots h_{y,u} \ldots h_{y,v} \ldots h_{y,n}$ denote cyclic prefixes of each pair of training symbols inserted before each pair of training symbols, where, a u-th cyclic prefix $h_{y,u}$ is the last $L_{cp}$ values of the training symbol $s_{y,u}$; $t_{y,1} \ldots t_{y,u} \ldots t_{y,v} \ldots t_{y,n}$ denote cyclic postfixes of each pair of training symbols inserted after each pair of training symbols, where, a u-th cyclic postfix $t_{y,u}$ is the foremost $L_{cp}$ values of the training symbol $s_{y,u}$; and the values of u and v are integers taken from 1 to n.

In this embodiment, each of the training symbols $s_{x,u}$ and $s_{y,u}$ is a vector of a length $N_f$, and in each polarization state, the training sequence contains 2n training symbols, and the total length of the training sequence is $2nN_t$, $N_t = N_f + L_{cp}$.

FIG. 4 is a schematic diagram of the structure of the training sequence of an embodiment of the present invention. As shown in FIG. 4, actually-transmitted data are before and after the training sequence TS, which are referred to as payload data.

In this embodiment, there exists a guard interval between the training sequence TS and the payload data, thereby preventing interference between the training sequence and the payload data.

In this embodiment, the training symbol may also be a training symbol satisfying one or both of the following conditions: 1) there exist low correlations between different pairs of training symbols; and 2) data belonging to different pairs of training symbols but positioned at the same frequency point in the two polarization states are uncorrelated.

In this embodiment, the training symbols $s_{x,u}$ and $s_{y,u}$ are time domain signals, on which fast Fourier transform (FFT) is performed to obtain corresponding frequency domain signals $\check{s}_{x,u}$ and $\check{s}_{y,u}$; in this embodiment, a letter with "˘" is used to denote a frequency domain signal.

The frequency domain signals obtained after transform are all vectors of a length $N_f$; hence, the frequency domain signals $\check{s}_{x,u}$ and $\check{s}_{y,u}$ may be selected from a constant amplitude zero auto correlation (CAZAC) family of sequences of a length $N_f$; furthermore, the length $N_f$ of the training symbols may be a prime number; however, it is not limited thereto. The effects of such selection exist in:

1) the CAZAC sequences are of constant amplitudes in both the time domain and the frequency domain, and have relatively low peak-to-average power ratio;

2) the correlations between different CAZAC sequences are of constant amplitudes, and are low relative to auto correlation peak values;

3) the inverse Fourier transform of the CAZAC sequences are still of CAZAC sequences; and 4) all the training symbols may be selected from the same family of CAZAC sequences.

In using the training sequence to determine an initial tap coefficient, in order to lower the complexity of calculation, the calculation of the initial tap coefficient is performed in the frequency domain. Therefore, for each frequency point, a 2-order matrix needs to be calculated. At least two pairs of different training sequences are needed to perform such calculation. Thus, in this embodiment, $n \geq 2$. Wherein, when n=2, the training symbols need to be selected are: the data of the training symbols in the two polarization states at each frequency point may be made uncorrelated as possible, that is, the number of conditions of matrix $$\begin{pmatrix} \check{s}_{x,1} & \check{s}_{y,1} \\ \check{s}_{x,2} & \check{s}_{y,2} \end{pmatrix}$$

at each frequency point is as low as possible. As there are multiple CAZAC sequences available for selection, the selected sequences may be made to satisfy the above requirement by searching in the CAZAC family of sequences.

In this embodiment, if the sampling rate is $f_s$, the range of frequencies of the frequency domain signals $\check{s}_{x,u}$ and $\check{s}_{y,u}$ is $f_s$.

FIG. 5A is a schematic diagram of the training sequence in a frequency domain, and FIG. 5B is a schematic diagram of the training sequence in a time domain.

As shown in FIG. 5A, in setting values of $\check{s}_{x,u}$ and $\check{s}_{y,u}$ in the frequency domain, several zeros are used to fill at the two sides of the spectrum.

According to Nyquist sampling theorem, discrete signals of a sampling rate $f_s$ are used to describe the waveforms of the training sequences.

The frequency domain resolution is $df=f_s/N_f$, that is, the frequency intervals of neighboring frequency points.

A training symbol contains $N_f$ frequency points in the frequency domain; wherein, the number of the non-zero frequency points is $N_d$, the non-zero frequency points are at the middle section of the whole spectrum, and there are $N_f-N_d$ frequency points filled with zeros at the two sides. The first non-zero frequency point to the left of the spectrum is at an $n_1$-th frequency point. Where, $N_f$, $N_d$ and $n_1$ are known in the receiver.

FIG. 6 is a flowchart of transmitting data of Embodiment 1 of the present invention. As shown in FIG. 6, in transmitting data by the transmitter, the method for transmitting data comprises:

step 601: inserting training sequences into payload data;

in this embodiment, a sixth processor 301 of the transmitter 300 inserts the training sequences into the payload data, as shown in FIG. 4; and the payload data may be generated in a signal generator;

wherein, in each polarization state, the training sequence comprises n pairs of training symbols, in the n pairs of training symbols, the training symbols of the same pair being identical, the training symbols of the different pair being different; and a cyclic prefix and a cyclic postfix are respectively inserted before and after each pair of training symbols, n being an integer greater than 1;

furthermore, the training symbols satisfy one or both of the following conditions: 1) there exist low correlations between different pairs of training symbols; and 2) data belonging to different pairs of training symbols but positioned at the same frequency point in the two polarization states are uncorrelated;

furthermore, the training symbols may be selected from a CAZAC family of sequences of a length $N_f$; and preferably, the length $N_f$ of the training symbols may be a prime number; however, it is not limited thereto;

step 602: sending the payload data containing the training sequences to a receiver;

in this embodiment, the sender 302 sends the data signals containing the training sequences to the receiver.

It can be seen from the above embodiment that setting of an initial tap coefficient of an equalizer, synchronization, frequency difference estimation and compensation may be performed with the training sequence inserted into the payload data by the transmitter, making the initial tap coefficient to be close to the optimal value, with the accuracy of calculation of a synchronization position being increased in synchronizing, and the precision of frequency difference estimation being increased in estimating frequency difference.

Embodiment 2

Figure 7:
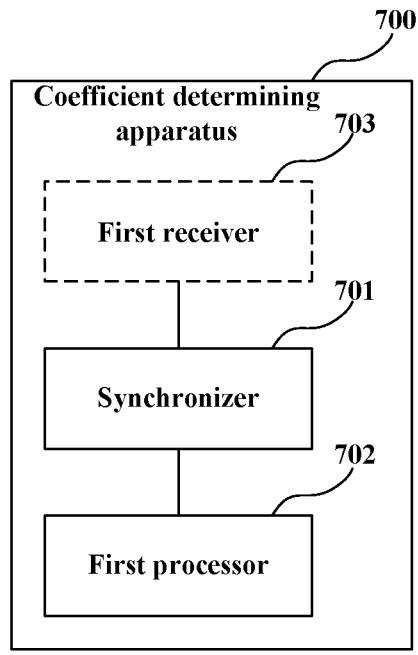
FIG. 7 is a schematic diagram of the structure of the coefficient determining apparatus of Embodiment 2 of the present invention.

FIG. 7 is a schematic diagram of the structure of the coefficient determining apparatus of Embodiment 2 of the present invention. As shown in FIG. 7, the apparatus 700 comprises: a first receiver 703, a synchronizer 701 and a first processor 702; wherein, the synchronizer 701 is configured to find a position of a training sequence from signals containing the training sequence received by a transmitter; and the first processor 702 is configured to set an initial tap coefficient of an equalizer according to the received signals and the training sequence.

In this embodiment, it is assumed that the data signals received from the transmitter are signals $r_x$ and $r_y$ in the two polarization states, the signals $r_x$ and $r_y$ being signals after being sampled, which may be denoted by a series of sampling values.

Thus, the synchronizer 701 may calculate section correlation values corresponding to each sampling point according to the number n of pairs of the training symbols, the length $N_f$ of the training symbols and the length $L_{cp}$ of the cyclic prefix and the cyclic postfix, determine the starting position of the training sequence according to a square of the moduli of the correlation values, and then determine the position of the training sequence in the data signals according to the starting position and the length of the training sequence (or $N_f$ and $L_{cp}$).

Wherein, "section correlation values" refer to correlation values between the sampling values of a length 2 $N_f$ of n sections corresponding to each sampling point. Thus, the calculation of "section correlation values" may be: calculating $N_f$ former sampling values and $N_f$ latter sampling values of a length 2 $N_f$ of n sections. In this embodiment, the serial number of the sampling point to which the maximum value of the square of the moduli of the correlation values corresponds may be taken as the starting position; however, as there may exist error due to the effect of noise, in this embodiment, in order to further improve the accuracy of calculation of the synchronization position, the following method may be used to determine the starting position:

performing weighting average on a predetermined sampling point serial number by using the square of the moduli of the correlation values in the two polarization states, so as to obtain the starting position of the training sequence; wherein, the predetermined sampling point serial number refers to a sampling point serial number of a square of the moduli of the correlation values α times greater than the maximum square of the moduli of the correlation values, α being a positive number greater than (n−1)/n and less than 1, which may be taken as 0.9 if n is not so high (n<10), with the object being to use only some points adjacent to the maximum peak value in calculating the synchronization position.

In this embodiment, as the synchronizer 701 may accurately determine the position of the training sequence, the first processor 702 may set the initial tap coefficient of the equalizer according to the received data signals and the training sequence. Wherein, any existing technique may be employed to set the initial tap coefficient of the equalizer. For example, an FIR filter may often be used as the equalizer, and a minimal mean square error (MMSE) algorithm may be used to set the initial tap coefficient of the FIR filter.

In this embodiment, the apparatus 700 may further comprise a first receiver 703 configured to receive data signals containing training sequences transmitted by the transmitter. This component is optional, and is denoted by dotted lines in the figure.

The training sequence is as described in Embodiment 1, the contents of which are incorporated herein, which shall not be described any further.

It can be seen from the above embodiment that as the training sequence contains n pairs of identical training symbols, in using such a feature to find the starting position of the training sequence to achieve synchronization, the accuracy of the calculation of the synchronization position may be improved, thereby making the set initial tap coefficient to be close to the optimal value, and lowering the amount of calculation and the complexity of calculation.

The synchronizer 701 and the first processor 702 of this embodiment shall be described below with reference to the figures.

It is assumed that the data signals received from the transmitter are signals $r_x$ and $r_y$ in the two polarization states, the signals $r_x$ and $r_y$ being signals after being sampled, which may be denoted by a series of sampling values. For example, there are m sampling points, m being an integer greater than or equal to 1, and the serial numbers of the sampling points are 1-m, the subscripts x/y denoting the two polarization states.

Figure 8:
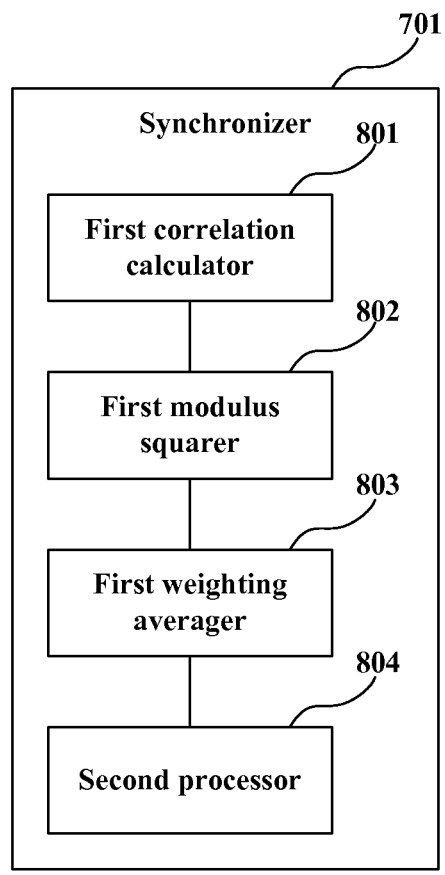
FIG. 8 is a schematic diagram of the structure of the synchronizer in FIG. 7.

FIG. 8 is a schematic diagram of the structure of the synchronizer in FIG. 7.

As shown in FIG. 8, the synchronizer 701 comprises a first correlation calculator 801, a first modulus squarer 802, a first weighting averager 803 and a second processor 804; wherein, the first correlation calculator 801 is configured to calculate, according to a length $N_f$ of the training symbols, the number of the training symbols and the lengths $L_{cp}$ of the cyclic prefix and cyclic postfix, correlation values of $N_f$ sampling values before and $N_f$ sampling values after n sections of sampling values with a length of 2 $N_f$ in each polarization state starting from each sampling point;

the first modulus squarer 802 is configured to calculate a square of the moduli of the correlation values;

the first weighting averager 803 is configured to perform weighted average on a predefined sampling point serial number by using the square of the moduli of the correlation values in two polarization states, so as to obtain a starting position of the training sequence; wherein the predefined sampling point serial number refers to a sampling point serial number of the square of the moduli of the correlation values α times greater than a maximum square of the moduli of the correlation value, a being a positive number greater than (n−1)/n and less than 1, which is often taken as 0.9; however, it is not limited to this value, and may be any value satisfying the above conditions; and the second processor 804 is configured to determine the position of the training sequence in the received data signals according to the starting position and the length of the training sequence (or $N_f$ and $L_{cp}$).

The components of the synchronizer 701 shall be described below, respectively.

In the first correlation calculator 801, formulae (3x) and (3y) below are used to calculate the correlation values:

$$a_x(i) = \sum_{k=0}^{n-1} \sum_{j=2kN_t}^{2kN_t+N_f-1} r_x(i+j)r_x^*(i+j+N_f), \quad (3x)$$

$$a_y(i) = \sum_{k=0}^{n-1} \sum_{j=2kN_t}^{2kN_t+N_f-1} r_y(i+j)r_y^*(i+j+N_f); \quad (3y)$$

In formulae (3x) and (3y), i denotes an i-th sampling point, i.e. an serial number of a sampling point, of which the value is taken as a positive integer; $a_x(i)$ and $a_y(i)$ denote correlation values in the x and y polarization states calculated taken the i-th sampling point as the starting position; k denotes a k-th section, of which the value is taken from 0 to n−1; variables (i+j) and (i+j+$N_f$) in the parentheses denote serial numbers of the sampling points; * denotes a complex conjugate; $r_x$ and $r_y$ denote received signals in the two polarization states; and the meanings of $N_t$ and $N_f$ are as described in Embodiment 1, which shall not be described herein any further.

In the first modulus squarer 802, the square of the moduli of the correlation values is calculated according to the result of calculation of the first correlation calculator 801, and formulae (4x) and (4y) may be used:

$$P_x(i) = |a_x(i)|^2 \quad (4x),$$

$$P_y(i) = |a_y(i)|^2 \quad (4y);$$

In formulae (4x) and (4y), $P_x(i)$ and $P_y(i)$ denote the square of the moduli of the correlation values.

In the first weighting averager 803, the starting position of the training sequence is determined according to the square of the moduli of the correlation values in the two polarization states obtained by the first modulus squarer 802. Wherein, the sampling point serial number "i" to which the maximum value of $P_x(i)$ and $P_y(i)$ corresponds is taken as the starting position. However, in consideration of the effect of noise, in an embodiment of the present invention, the first weighting averager 803 performs weighting average on the predetermined sampling point serial number by using the square $P_x(i)$ and $P_y(i)$ of the moduli of the correlation values in the two polarization states, so as to obtain the starting position of the training sequence, and the starting position may be calculated by using the following two manners:

EXAMPLE 1 calculating the starting positions n the two polarization states, respectively, and formulae (5x) and (5y) may be used:

$$i_x = \Sigma_{i \in A_x} i P_x(i) / \Sigma_{i \in A_x} P_x(i) \quad (5x),$$

$$i_y = \Sigma_{i \in A_y} i P_y(i) / \Sigma_{i \in A_y} P_y(i) \quad (5y);$$

in the above formulae, $A_x$ and $A_y$ denote sets of sampling point serial numbers of which the squares of the moduli of the correlation values are α times greater than their peak values, which may be expressed by formulae (6x) and (6y) below:

$$A_x = \{i | P_x(i) > \alpha \cdot \max(P_x(i))\} \quad (6x),$$

$$A_y = \{i | P_y(i) > \alpha \cdot \max(P_y(i))\} \quad (6y);$$

in formulae (6x) and (6y), α is a positive number greater than (n−1)/n and less than 1, for example, 0.9.

It can be seen from the above embodiment that the starting position obtained by weighting average by using formulae (5x) and (5y) is more accurate than that determined by taking the sampling point serial number to which the maximum value of "$P_x(i)$ and $P_y(i)$" corresponds.

In this embodiment, as polarization mode dispersion exists in the optical fiber, the starting positions $i_x$ and $i_y$ are not necessarily identical, and in order to specify the position of the training sequence in the received signals, a unified starting position is obtained. In such a case, the first weighting averager 803 further takes an average value of the starting positions in each polarization state as the unified starting position.

That is, the average value $i_s$ of $i_x$ and $i_y$ is taken as the starting position, which is expressed by formula (7) below:

$$i_{s1} = \text{round}\left(\frac{i_x + i_y}{2}\right); \quad (7)$$

in formula (7), round(·) denotes rounding, and $i_{s1}$ is an integer which denotes that the $i_{s1}$-th sampling value of the received signals is the first sampling value of $s_{x,1}$ and $s_{y,1}$ in formulae (2x) and (2y).

EXAMPLE 2 the unified starting position is calculated using formula (8) below by using the square of the moduli of the correlation values calculated in the two polarization states, instead of respectively calculating the starting positions in the two polarization states:

$$i_{s2} = \frac{\sum_{i \in A_x} i P_x(i) + \sum_{i \in A_y} i P_y(i)}{\sum_{i \in A_x} P_x(i) + \sum_{i \in A_y} P_y(i)}; \quad (8)$$

in formula (8), the meanings of $A_x$, $A_y$ and $P_x(i)$, $P_y(i)$ are as described above. The starting positions determined in the above two embodiments are hereinafter denoted by "$i_s$".

In the second processor 804, after the first weighting averager 803 determines the starting position $i_s$ of the training sequence, the second processor 804 may determine the position of the training sequence in the data signals according to the starting position and the length of the training sequence (or $N_f$ and $L_{cp}$).

Wherein, the second processor 804 may take $N_f$ sampling values corresponding to each training symbol (total 2n training symbols) according to the starting position and $N_f$ and $L_{cp}$, as expressed by formulae (9x), (10x), (9y) and (10y):

the sampling value sequence of a length $N_f$ corresponding to the i-th (i=1, 2 ... 2n) training symbol is:

when i is an odd number:

$$r_{x,i} = r_x(i_s + m_i : i_s + N_f - 1 + m_i) \quad (9x),$$

$$r_{y,i} = r_y(i_s + m_i : i_s + N_f - 1 + m_i) \quad (9y);$$

when i is an even number:

$$r_{x,i} = r_x(i_s + N_f + m_i : i_s + 2N_f - 1 + m_i) \quad (10x),$$

$$r_{y,i} = r_y(i_s + N_f + m_i : i_s + 2N_f - 1 + m_i) \quad (10y);$$

In formulae (9x), (9y), (10x) and (10y):

the subscript i denotes corresponding to the i-th training symbol, $$m_i = 2\left(\text{ceil}\left(\frac{i}{2}\right) - 1\right) N_f;$$

and ceil(•) denotes ceiling rounding.

Furthermore, the variables in the parentheses in formulae (9x), (9y), (10x) and (10y) denote sampling point serial numbers, and the subscript i denotes corresponding to the i-th training symbol (i=1, 2 ... 2n), that is, $r_{x,i}$ and $r_{y,i}$ are received signals corresponding to the training symbols $s_{x,i}$, $s_{y,i}$ in formulae (2x) and (2y), which are vectors of a length $N_f$. And ":" denotes being from somewhat to somewhat else; for example, a:b denotes being from a to b, that is, a, a+1, ... b−1, b, and a and b being integers.

It can be seen from the above embodiment that the synchronization is performed by the synchronizer 701, and the accuracy of the calculation of the starting positions may be improved as there are n pairs of identical training symbols available for use.

In this embodiment, after the synchronizer 701 determines the position of the training sequence, the first process 702 may set the initial tap coefficient of the equalizer according to the received data signals and the training sequence.

As there are relatively more FIR tap coefficients $L_F$, for a dual-polarization system, inversion of a $2L_F$ order matrix will be met in solving a minimal mean square error in the time domain, with the calculation complexity being relatively high. As the convolution of the time domain is equivalent to frequency domain multiplication, the time domain signals may be converted into frequency domain signals, frequency domain initial tap coefficient may be set first, and then the frequency domain initial tap coefficient may be converted into a time domain initial tap coefficient.

Figure 9:
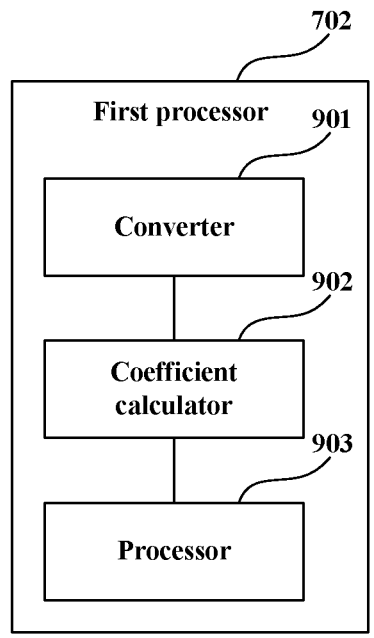
FIG. 9 is a schematic diagram of the structure of the first processor in FIG. 7.

FIG. 9 is a schematic diagram of the structure of the first processor in FIG. 7. As shown in FIG. 9, the first process 702 comprises a converter 901, a calculator 902 and a processor 903; wherein, the converter 901 is configured to convert the received signals into the frequency domain;

the calculator 902 is configured to calculate the coefficients of the frequency domain by using the received signals and the training sequence; and the processor 903 is configured to convert the coefficients of the frequency domain to obtain the initial tap coefficient of the equalizer at the time domain.

The process of setting the initial tap coefficient of the equalizer by using the MMSE method shall be described below by way of an example.

For example, the relationship between the input and output of the frequency domain equalizer may be obtained through FFT by using formula (1), that is:

$$\breve{s}_x = \breve{w}_{xx}\breve{r}_x + \breve{w}_{yx}\breve{r}_y \quad (16x)$$

$$\breve{s}_y = \breve{w}_{xy}\breve{r}_x + \breve{w}_{yy}\breve{r}_y \quad (16y)$$

different from formula (1), the items with "⌣" denote frequency domain signals; therefore, the convolution in formula (1) is changed into multiplication. A two-order matrix $$\begin{bmatrix} \breve{w}_{xx} & \breve{w}_{yx} \\ \breve{w}_{xy} & \breve{w}_{yy} \end{bmatrix}$$

is only needed be obtained at a frequency point in frequency domain equalization, for being taken as the coefficients of the equalizer at the frequency domain. This avoids the inversion operation of high-order matrixes, with the complexity being relatively low.

For each frequency point of the training symbols, the data transmitted by the transmitter at the frequency point may be expressed as:

$$T = \begin{bmatrix} \breve{S}_{x,1} \ldots \breve{S}_{x,i} \ldots \breve{S}_{x,2n} \\ \breve{S}_{y,1} \ldots \breve{S}_{y,i} \ldots \breve{S}_{y,2n} \end{bmatrix} \quad (17)$$

In the converter 901, the converter 901 may convert the received signals into the frequency domain, which are expressed as:

$$R = \begin{bmatrix} \breve{r}_{x,1} \ldots \breve{r}_{x,i} \ldots \breve{r}_{x,2n} \\ \breve{r}_{y,1} \ldots \breve{r}_{y,i} \ldots \breve{r}_{y,2n} \end{bmatrix}; \quad (18)$$

in formula (18), $\breve{r}_{x,i}$, $\breve{r}_{y,i}$ are Fourier transform of time domain signals $r_{x,i}$ and $r_{y,i}$ corresponding to $s_{x,i}$, $s_{y,i}$.

For each frequency point, the coefficient matrix to be obtained is:

$$W = \begin{bmatrix} \breve{w}_{xx} & \breve{w}_{yx} \\ \breve{w}_{xy} & \breve{w}_{yy} \end{bmatrix}. \quad (19)$$

The above T and R are matrixes of 2×2n.

The coefficient calculator 902 obtains the coefficient matrix of formula (19) by using the MMSE method:

$$W = TR^H(RR^H)^{-1} \quad (20);$$

In formula (20), the superscript "H" denotes a conjugate transpose operation.

The coefficients calculated by the coefficient calculator 902 are initial tap coefficients $\breve{w}_{xx}$, $\breve{w}_{yx}$, $\breve{w}_{xy}$, $\breve{w}_{yy}$ of the equalizer at the frequency domain.

The processor 903 obtains the initial tap coefficients $w_{xx}$, $w_{yx}$, $w_{xy}$, $w_{yy}$ of the equalizer at the time domain by converting the coefficients at $\breve{w}_{xx}$, $\breve{w}_{yx}$, $\breve{w}_{xy}$, $\breve{w}_{yy}$ at the frequency domain.

Wherein, after the coefficient matrix of 2×2 is obtained in the coefficient calculator 902, the processor 903 performs inverse fast Fourier transform (IFFT) on $\breve{w}_{xx}$, $\breve{w}_{yx}$, $\breve{w}_{xy}$, $\breve{w}_{yy}$ to obtain the coefficients $w_{xx}$, $w_{yx}$, $w_{xy}$, $w_{yy}$ at the time domain, all of which are vectors of a length $N_f$. The four coefficients at the time domain may be directly (or after being appropriately truncated) taken as the initial tap coefficients of the equalizer, such as the initial tap coefficients of the butterfly FIR filter shown in FIG. 2.

As the output of the equalizer (FIR filter) is made close to the transmitted signals as possible when the coefficient calculator 902 calculates the initial tap coefficient by using formula (20), the calculated coefficient may be used to approximately compensate for channel damages. And no iterative convergence procedure is needed in obtaining the coefficient, and the obtaining the coefficient may be finished in a relatively short time. Based on the initial tap coefficient, the tap coefficients may be further optimized by using an iterative update method, on which other digital signal processing may also be performed.

It can be seen from the above embodiment that the training sequence facilitates the calculation of the tap coefficients; that is, 1) as the power of the CAZAC sequences used in the training symbols at each frequency point is identical, the calculation of the initial tap coefficients is fair to different frequency points; 2) the training sequence contains different training symbols, and different training symbols provide different data samples for the calculation of the coefficients, this makes the result of calculation based on the MMSE rule more accurate; and 3) the training sequence contains also identical training symbols, and although the identical training symbols provide identical data samples, the noise samples superimposed on them are different, an averaged effect for the coefficients is obtained when the coefficients are calculated according to the identical training symbols, and this has a suppressing effect on the noise.

Embodiment 3

Figure 10:
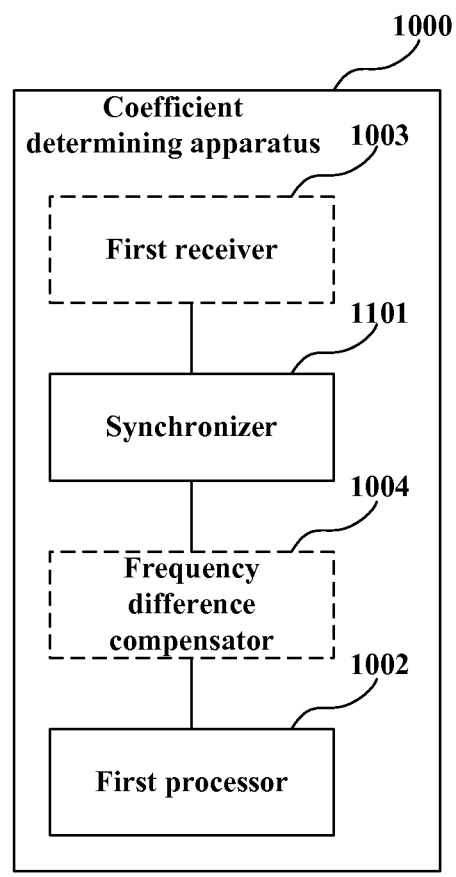
FIG. 10 is a schematic diagram of the structure of the coefficient determining apparatus of Embodiment 3 of the present invention.

FIG. 10 is a schematic diagram of the structure of the coefficient determining apparatus of Embodiment 3 of the present invention. As shown in FIG. 10, the apparatus 1000 comprises a synchronizer 1001 and a first processor 1002, or further comprises a first receiver 1003, with the functions of them being similar to those in Embodiment 2, which shall not be described any further.

In this embodiment, after synchronization is performed by the synchronizer 1001, in consideration that there is generally a certain frequency difference (of a magnitude of MHz-GHz) between a local oscillator laser and a laser in the transmitter, and the calculation of the initial tap coefficients will be affected when the frequency difference is relatively large, in this embodiment, the frequency difference is estimated first and then compensated for before calculating the initial tap coefficients, and the first processor 1002 sets the initial tap coefficients according to the signals with the frequency difference being compensated for, so that the setting of the initial tap coefficients is more accurate.

In such a case, the coefficient determining apparatus 1000 may further comprise a frequency difference compensator 1004 configured to estimate and compensate for a frequency difference between the received data signals.

Therefore, the first processor 1002 is further configured to set the initial tap coefficient of the equalizer according to the training sequence and the data signals compensated by the frequency difference compensator 1004. Following description is given to the frequency difference compensator 1004 with reference to a figure.

Figure 11:
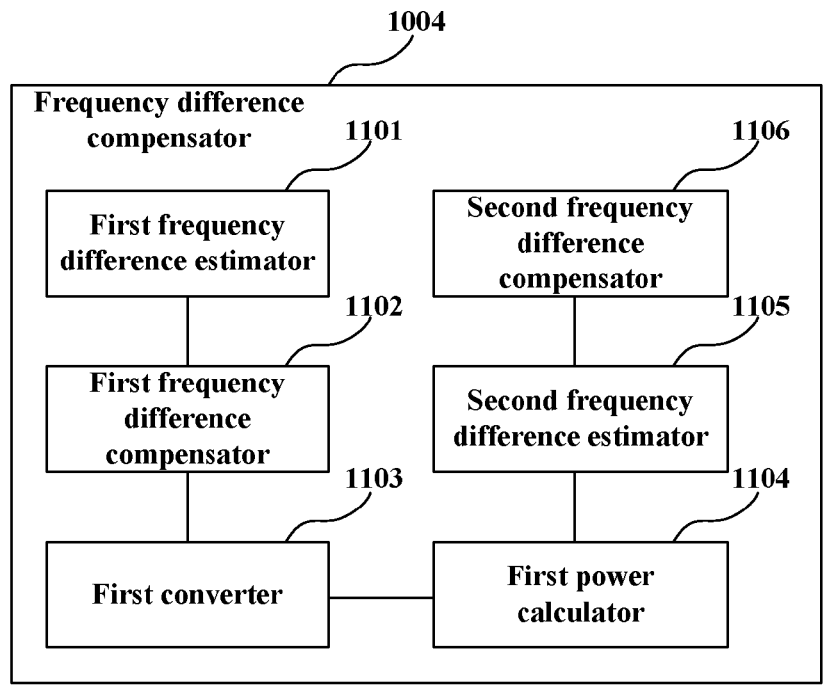
FIG. 11 is a schematic diagram of the structure of the frequency difference compensator in FIG. 10.

FIG. 11 is a schematic diagram of the structure of the frequency difference compensator in FIG. 10. As shown in FIG. 11, the frequency difference compensator 1004 comprises: a first frequency difference estimator 1101, a first frequency difference compensator 1102, a first converter 1103, a first power calculator 1104, a second frequency difference estimator 1105 and a second frequency difference compensator 1106; wherein, the first frequency difference estimator 1101 is configured to calculate a first frequency difference by using a correlation value corresponding to the starting position of the training sequence, the length of the training sequence and a sampling time interval;

the first frequency difference compensator 1102 is configured to perform first frequency difference compensation on the received data signals by using the first frequency difference;

the first converter 1103 is configured to convert the time domain signals to which the training sequence corresponds into a frequency domain;

the first power calculator 1104 is configured to calculate the power of the training sequence at each frequency point;

the second frequency difference estimator 1105 is configured to calculate a second frequency difference by using the calculated power, positions of frequency point padded with data and positions of frequency point padded with zero in the frequency spectrum of the training sequence; and the second frequency difference compensator 1106 is configured to, according to the second frequency difference, perform second frequency difference compensation on the signals on which the first frequency difference compensation has been performed.

Following description is given with reference to detailed formulae.

In this embodiment, the first frequency difference estimator 1101 may use formula (21) to calculate the first frequency difference $f_1$:

$$f_1 = (\arg(a_x(i_s)) + \arg(a_y(i_s)))/(4\pi N_f dt) \quad (21);$$

in formula (21), $dt=1/f_s$ the sampling time interval, and $\arg(\cdot)$ is an argument calculating operation, with a value range $[-\pi, \pi]$. Therefore, the first frequency difference $f_i$ estimated in formula (21) is within $[-df/2, df/2]$, and $df=1/(N_f dt)$ is a frequency domain resolution, that is, frequency intervals between neighboring frequency points.

The first frequency difference compensator 1102 performs first frequency difference compensation on the received data signals by using the first frequency difference estimated by the first frequency difference estimator 1101, and the compensated signals are expressed as:

$$r'_x(i) = r_x(i)\exp(-j2\pi f_1 \cdot i dt) \quad (22x),$$

$$r'_y(i) = r_y(i)\exp(-j2\pi f_1 \cdot i dt) \quad (22y).$$

Similar to formulae (9x), (9y), (10x) and (10y) in Embodiment 2, $r'_{x,i}(i)$ and $r'_{y,i}(i)$ may be obtained from $r'_x(i)$ and $r'_y(i)$, which are vectors of a length $N_f$ corresponding to training symbols $s_{x,i}, s_{y,i}$.

When the absolute value of the actual frequency difference is greater than $df/2$, the estimation range of formula (21) will be exceeded. It can be seen from the properties of $\arg(\cdot)$ and formula (21) that the difference between the true frequency difference and the first frequency difference $f_1$ is an integer multiple of $df$, which is denoted by $f_2$.

As shown in FIG. 4, some frequency points at the two sides of the spectrum of the training sequence are filled with zeros, and the parts filled with data occupy the middle section of the spectrum. It is known that there are $N_d$ frequency points carrying data and $N_f - N_d$ frequency points filled with zeros, and the first frequency point carrying data is the $n_1$-th one of $N_f$ frequency points. Based on the above information, the second frequency difference $f_2$ may be estimated according to the frequency spectrum estimation of $r'_{x,i}$ and $r'_{y,i}$. The process of estimating the second frequency difference $f_2$ shall be described below in detail.

First, the first converter 1103 converts the time domain signals to which the training sequence corresponds into a frequency domain signals;

for example, the received signals after the first frequency difference compensation are expressed as $r'_{x,i}$ and $r'_{y,i}$ in the time domain, and are converted into signals in the frequency domain after FFT, which are expressed as $\breve{r}_{x,i}, \breve{r}_{y,i}$.

Second, the first power calculator 1104 calculates the power of the training sequence at each frequency point; wherein formula (23) may used in calculating the power $\breve{P}$:

$$\breve{P} = \sum_{i=1}^{2n}(|\breve{r}'_{x,i}|^2 + |\breve{r}'_{y,i}|^2); \quad (23)$$

in formula (23), i denotes a training symbol, the range of values of which being 1 to 2n, and n being an integer greater than 1; summation is performed on 2n training symbols, and $\breve{P}$ is still a vector of a length $N_f$, denoting the power of the symbol at each frequency point.

The second frequency difference estimator 1105 may calculate the second frequency difference $f_2$ according to formula (24) below:

$$f_2 = (i_{max} - n_1) \cdot df \quad (24);$$

in formula (24), $i_{max}$ is i making sum ($\breve{P}(i:i+N_d-1)$) to be maximum, $\breve{P}(i:i+N_d-1)$ denotes values of $\breve{P}$ at the i-th to the $(i+N_d-1)$-th frequency points, and sum($\cdot$) is a summation operation.

The second frequency difference compensator 1106 performs second frequency difference $f_2$ compensation on the signals ($r'_x(i)$ and $r'_y(i)$) on which the first frequency difference compensation $f_1$ has been performed, according to the second frequency difference $f_2$ estimated by the second frequency difference estimator 1105, so as to finally obtain signals ($r''_x(i)$ and $r''_y(i)$) with all the frequency differences being compensated for; wherein formulae (25x) and (25y) are used to obtain the signals with the second frequency difference being compensated:

$$r''_x(i) = r'_x(i) \exp(-j2\pi f_2 \cdot i dt) \quad (25x),$$

$$r''_y(i) = r'_y(i) \exp(-j2\pi f_2 \cdot i dt) \quad (25y)$$

It can be seen from above that the result of frequency difference estimation is the sum of the first frequency difference compensation $f_1$ and the second frequency difference $f_2$, which is expressed as:

$$f_{total} = f_1 + f_2 \quad (26)$$

The frequency difference given in formula (26) may offer a relatively good reference value for the frequency difference estimator in the receiver.

After the received signals are compensated by the frequency difference estimator shown in FIG. 11, in the first processor 1002, the initial tap coefficient of the equalizer is set by using the compensated received signals and the training sequence; and the method used by the first processor 1002 for setting the initial tap coefficient is similar to that of the first processor 702 in Embodiment 2, with a difference being that the received signals in formula (18) are signals subjected to the second compensation, which are expressed as:

$$R = \begin{bmatrix} \tilde{r}''_{x,1} & \tilde{r}''_{x,i} & \cdots & \tilde{r}''_{x,2n} \\ \tilde{r}''_{y,1} & \tilde{r}''_{y,i} & \cdots & \tilde{r}''_{y,2n} \end{bmatrix} \quad (27)$$

The method for setting the initial tap coefficient is similar to that in Embodiment 2, which shall not be described herein any further.

Following description is given with reference to the schematic diagram of the structure of FIG. 10, the following flowchart and the coefficient determining method of Embodiment 3 of the present invention.

Figure 12:
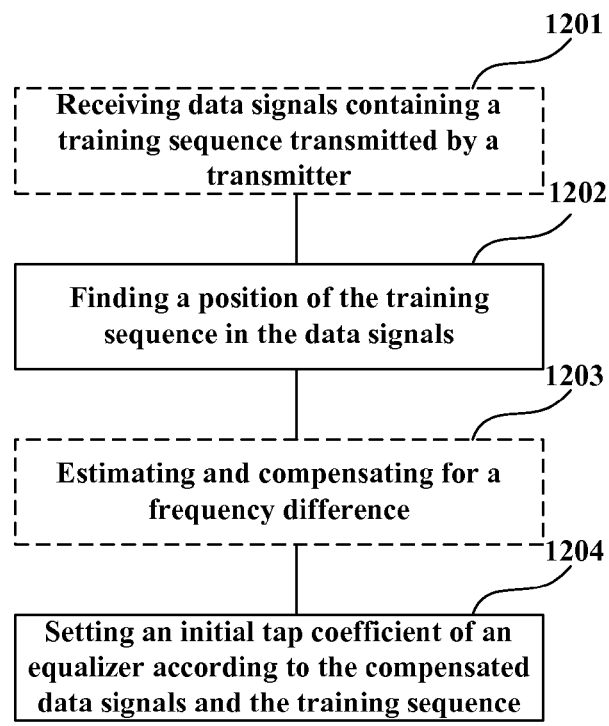
FIG. 12 is a flowchart of the coefficient determining method of Embodiment 3 of the present invention.

FIG. 12 is a flowchart of the coefficient determining method of Embodiment 3 of the present invention, the method comprising:

step 1201: receiving data signals containing a training sequence transmitted by a transmitter;

in this embodiment, the first receiver 1003 receives the data signals containing a training sequence transmitted by the transmitter, the structure of the training sequence being as described in Embodiment 1 and FIG. 4, which shall not be described herein any further;

step 1202: finding a position of the training sequence in the data signals;

in this embodiment, the synchronizer 1001 determines the position of the training sequence in the data signals, with the method being similar to that of Embodiment 2, which shall be described later with reference to the flowchart of a synchronization method shown in FIG. 13, and shall not be described herein any further;

step 1203: estimating and compensating for a frequency difference;

in this embodiment, the frequency difference compensator 1004 compensates for a frequency difference, similar to Embodiment 2, which shall be described later with reference to the flowchart of a frequency difference compensation method shown in FIG. 14, and shall not be described herein any further;

step 1204: setting an initial tap coefficient of an equalizer according to the compensated data signals and the training sequence;

wherein, the first processor 1002 sets the initial tap coefficient of the equalizer according to the compensated data signals and the training sequence, and the following manner may be used:

converting the signals with frequency difference being compensated into a frequency domain; calculating coefficients at the frequency domain by using the compensated signals and the training sequence; and converting the coefficients at the frequency domain to obtain the initial tap coefficient of the equalizer at the time domain;

the manner of setting the initial tap coefficient is as described in embodiments 2 and 3, and formulae (16x), (16y), (17), (27), (19) and (20) may be used, which shall not be described herein any further.

It can be seen from the above embodiment that steps 1201 and 1203 are optional.

Figure 13:
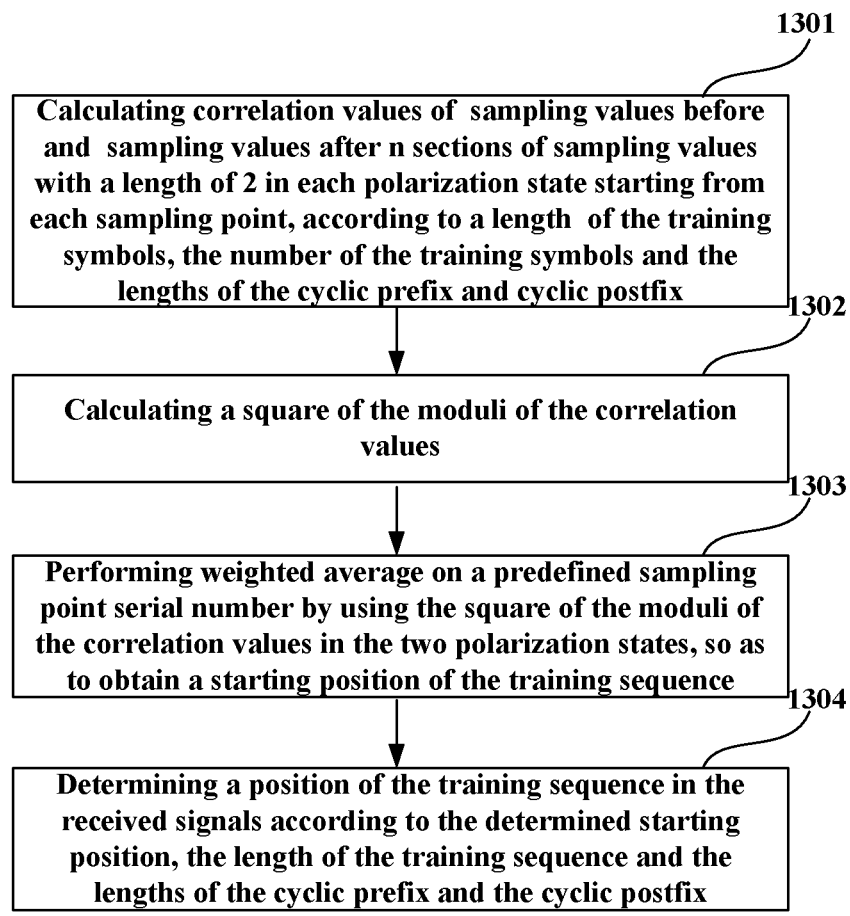
FIG. 13 is a flowchart of a synchronization method.

FIG. 13 is a flowchart of a synchronization method. As shown in FIG. 13, the method comprises:

step 1301: calculating correlation values of $N_f$ sampling values before and $N_f$ sampling values after n sections of sampling values with a length of $2 N_f$ in each polarization state starting from each sampling point, according to a length $N_f$ of the training symbols, the number of the training symbols and the lengths of the cyclic prefix and cyclic postfix;

wherein, the first correlation calculator 801 may use the above formulae (3x) and (3y) to calculate the correlation values;

step 1302: calculating a square of the moduli of the correlation values;

wherein, the first modulus squarer 802 may use formulae (4x) and (4y) to calculate the square of the moduli of the correlation values;

step 1303: performing weighted average on a predefined sampling point serial number by using the square of the moduli of the correlation values, so as to obtain a starting position of the training sequence; wherein the predefined sampling point serial number refers to a sampling point serial number of the square of the moduli of the correlation values α times greater than a maximum square of the moduli of the correlation value, α being an integer greater than (n−1)/n and less than 1;

wherein, the first weighting averager 803 performs the weighted average by using formulae (5x), (5y), (6x) and (6y), or further (7), or performs the weighted average by using formula (8);

step 1304: determining a position of the training sequence in the received signals, according to the starting position and the length of the training sequence;

wherein, the second processor 804 may use formulae (9x), (9y) or (10x) and (10y) in determination.

Figure 14:
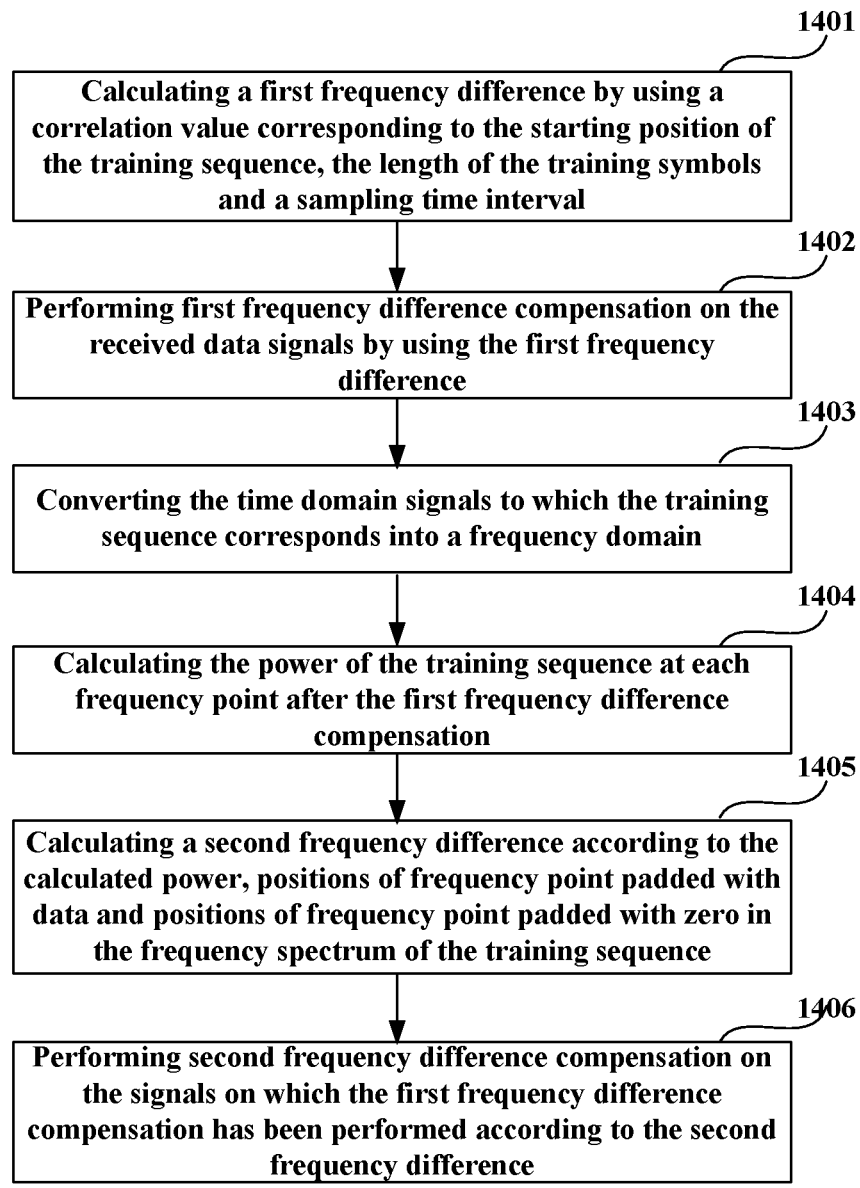
FIG. 14 is a flowchart of a frequency difference compensation method.

FIG. 14 is a flowchart of a frequency difference compensation method. As shown in FIG. 14, the method comprises:

step 1401: calculating a first frequency difference by using a correlation value corresponding to the starting position of the training sequence, the length of the training symbols and a sampling time interval;

wherein, the first frequency difference estimator 1101 may estimate the first frequency difference by using formula (21);

step 1402: performing first frequency difference compensation on the received data signals by using the first frequency difference;

wherein, the first frequency difference compensator 1102 may perform the first frequency difference compensation by using the first frequency difference in any existing manner, for example, performing the frequency difference compensation by using formulae (22x) and (22y);

step 1403: converting the time domain signals to which the training sequence corresponds into a frequency domain;

wherein, the first converter 1103 may perform the conversion by using any existing manner, which shall not be described herein any further;

step 1404: calculating the power of the training sequence at each frequency point after the first frequency difference compensation;

wherein, the first power calculator 1104 may calculate the power by using any manner, for example, calculating the power by using formula (23);

step 1405: calculating a second frequency difference according to the calculated power, positions of frequency point padded with data and positions of frequency point padded with zero in the frequency spectrum of the training sequence;

wherein, the second frequency difference estimator 1105 may estimate the second frequency difference by using formula (24);

step 1406: performing second frequency difference compensation on the signals on which the first frequency difference compensation has been performed according to the second frequency difference;

wherein, the second frequency difference compensator 1106 may perform the frequency difference compensation by using any manner, for example, performing the frequency difference compensation by using formulae (25x) and (25y).

It can be seen from the above embodiment that the training sequence facilitates the estimation of frequency differences, that is: 1) the first frequency difference $f_1$ is estimated according to the correlation values, and the training sequence contains n pairs of identical training symbols available for use, this facilitates the improvement of precision of estimation; 2) the CAZAC sequences are used in the training symbols, and the power of which is identical at different frequency points; while zero-filled frequency points are at the two sides of the spectrum, and this makes the method of estimating the second frequency difference $f_2$ according to the power of the training symbols at each frequency point more reliable and the range of estimation very large; and 3) the range of estimation of the first frequency difference $f_1$ is exactly equal to the frequency domain resolution (intervals between neighboring frequency points), which makes seamless transition between the two steps of estimation of the frequency differences possible, without a blind area.

The training sequence facilitates the calculation of the tap coefficients; that is, 1) as the power of the CAZAC sequences used in the training symbols at each frequency point is identical, the calculation of the initial tap coefficients is fair to different frequency points; 2) the training sequence contains different training symbols, and different training symbols provide different data samples for the calculation of the coefficients, this makes the result of calculation based on the MMSE rule more accurate; and 3) the training sequence contains also identical training symbols, and although the identical training symbols provide identical data samples, the noise samples superimposed on them are different, an averaged effect for the coefficients is obtained when the coefficients are calculated according to the identical training symbols, and this has a suppressing effect on the noise.

Embodiment 4

FIG. 15 is a schematic diagram of the structure of the equalizer of Embodiment 4 of the present invention. As shown in FIG. 15, the equalizer 1500 comprises: a third processor 1501 and the fourth processor 1502; wherein, the third processor 1501 is configured to determine an initial tap coefficient of the equalizer, the third processor 1501 being the coefficient determining apparatus 700 or 1000 in Embodiment 2 or 3, which shall not be described herein any further; and the fourth processor 1502 is configured to update a tap coefficient by using the initial tap coefficient determined by the third processor 1501 or by using the initial tap coefficient and other training sequences distributed in a certain proportion in the data signals transmitted by a transmitter, and perform equalization on received signals.

Following description is given to an equalizing method with reference to FIG. 15 and the flowchart in FIG. 16 below.

FIG. 16 is a flowchart of the equalizing method of Embodiment 4 of the present invention. As shown in FIG. 16, the method comprises:

step 1601: setting an initial tap coefficient of the equalizer, wherein, the initial tap coefficient may be determined by using the methods described in embodiments 2 and 3, which shall not be described herein any further;

step 1602: updating a tap coefficient by using the initial tap coefficient or by using the initial tap coefficient and other training sequences distributed in a certain proportion in the data signals transmitted by a transmitter, and performing equalization on received signals;

in this embodiment, in updating tap coefficient and performing equalization on received signals by using the initial tap coefficient, any existing method may be used, such as a constant modulus algorithm (CMA) or a least mean square (LMS) error method;

in another embodiment, as described in the above embodiment, the training sequence in an embodiment of the present invention, such as the training sequence TS shown in FIG. 4, may be used to obtain an initial tap coefficient close to the optimal value; furthermore, as shown in FIG. 17, in payload data, some other relatively short training sequences (denoted by T) are cyclically inserted; thus, the initial tap coefficient may be updated according to these training sequences T.

For example, phase modulation formats (such as QPSK, and 8PSK, etc.) may be used for the symbols to which the training sequences T correspond, and any modulation formats may be used for the payload data, which may be nonconstant modulus (such as 8QAM, and 16QAM, etc.). As the tap coefficients are updated through only the training sequences T and a conventional CMA may be used, the update of the tap coefficients is made uncorrelated to the modulation formats of the payload data. This solution is applicable to a coherent optical communication system of which the modulation format is variable or which employs a high-order nonconstant modulus modulation format, with an advantage being that for different modulation formats, the same algorithm may be used to update coefficients of an equalizer.

It can be seen from the above embodiment that as the training sequence contains n pairs of identical training symbols, in finding the starting position of the training sequence and achieving synchronization by using such a feature, the accuracy of calculating the synchronization position may be improved, thereby making the set initial tap coefficient to be close to the optimal value, and based on the initial tap coefficient, further updating the tap coefficients, and lowering the amount of calculation and complexity of calculation.

Embodiment 5

An embodiment of the present invention provides a synchronizer configured to find a position of a training sequence in received data signals. Its composition may be realized by the synchronizer shown in FIG. 8 of Embodiment 2, and the synchronization method is as shown in FIG. 13, the contents of which are incorporated herein, which shall not be described any further.

Embodiment 6 (Frequency Difference Compensator)

An embodiment of the present invention provides a frequency difference compensator configured to perform frequency difference estimation and compensation. Its composition may be realized by the frequency difference compensator shown in FIG. 11 of Embodiment 2, and the frequency difference estimation and compensation method is as shown in FIG. 14, the contents of which are incorporated herein, which shall not be described any further.

Embodiment 7

Figure 18:
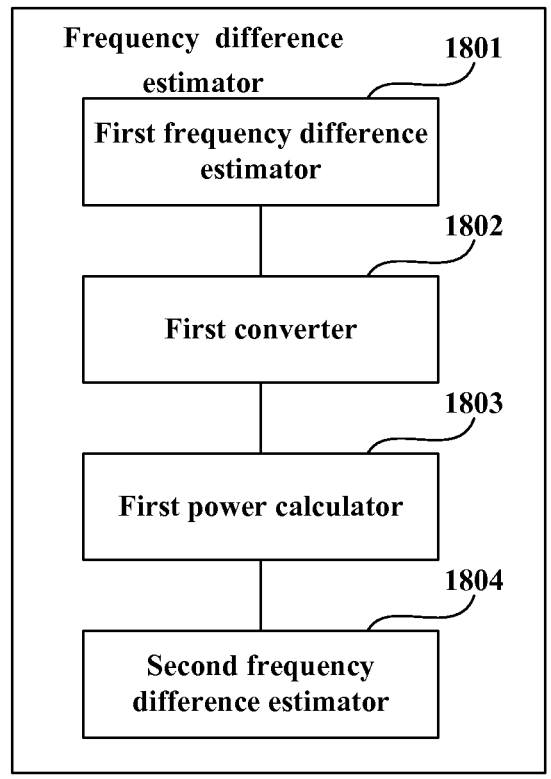
FIG. 18 is a schematic diagram of the structure of the frequency difference estimator of Embodiment 7 of the present invention.

FIG. 18 is a schematic diagram of the structure of the frequency difference estimator of Embodiment 7 of the present invention. As shown in FIG. 18, the frequency difference estimator comprises: a first frequency difference estimator 1801, a first converter 1802, a first power calculator 1803 and a second frequency difference estimator 1804; wherein, the first frequency difference estimator 1801 is configured to calculate a first frequency difference by using a correlation value corresponding to the starting position of the training sequence, the length of the training symbols and a sampling time interval; the first converter 1802 is configured to convert the time domain signals to which the training sequence corresponds into a frequency domain; the first power calculator 1803 is configured to calculate the power of the training sequence at each frequency point; and the second frequency difference estimator is configured to calculate a second frequency difference according to the calculated power, positions of frequency point padded with data and positions of frequency point padded with zero in the frequency spectrum of the training sequence.

In the above embodiment, the functions of each component are as those of the frequency difference compensator shown in FIG. 11, which shall not be described herein any further.

Embodiment 8

An embodiment of the present invention provides a receiver, comprising one or more of the following:

the coefficient determining apparatus in Embodiment 2 or 3, the equalizer in Embodiment 4, the synchronizer in Embodiment 5, the frequency difference compensator in Embodiment 6, and the frequency difference estimator in Embodiment 7.

Figure 19:
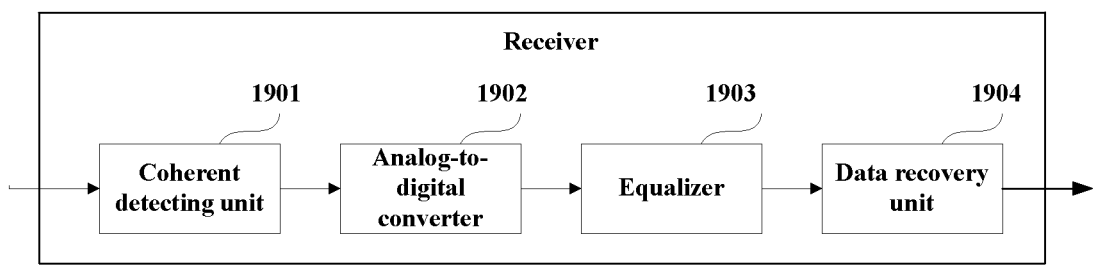
FIG. 19 is a schematic diagram of the structure of the receiver of Embodiment 8 of the present invention.

FIG. 19 is a schematic diagram of the structure of the receiver of Embodiment 8 of the present invention. As shown in FIG. 19, the receiver comprises a coherent detecting unit 1901, an analog-to-digital converter 1902, an equalizer 1903 and a data recovery unit 1904; wherein, the coherent detecting unit 1901 is configured to perform coherent detection on input signals, and the analog-to-digital converter 1902 is configured to perform analog-to-digital conversion on the signals outputted by the coherent detecting unit 1901. An adaptive equalizer in the equalizer 1903 may be realized by the equalizer in Embodiment 4, the contents of which are incorporated herein, which shall not be described any further. And the data recovery unit 1904 is configured to perform data recovery on the signals compensated by the equalizer 1903.

In this embodiment, the coherent detecting unit 1901, analog-to-digital converter 1902, equalizer 1903 and data recovery unit 1904 may all be realized by existing structures and functions, and the embodiment of the present invention is not limited thereto.

Figure 1:
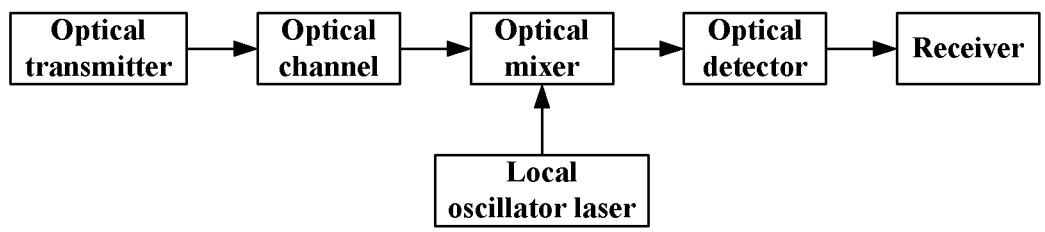
FIG. 1 is a schematic diagram of the structure of a coherent optical communication system.
Figure 2:
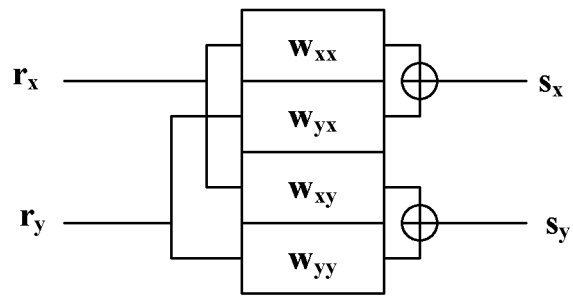
FIG. 2 is a schematic diagram of the structure of a butterfly FIR filter.
Figure 20:
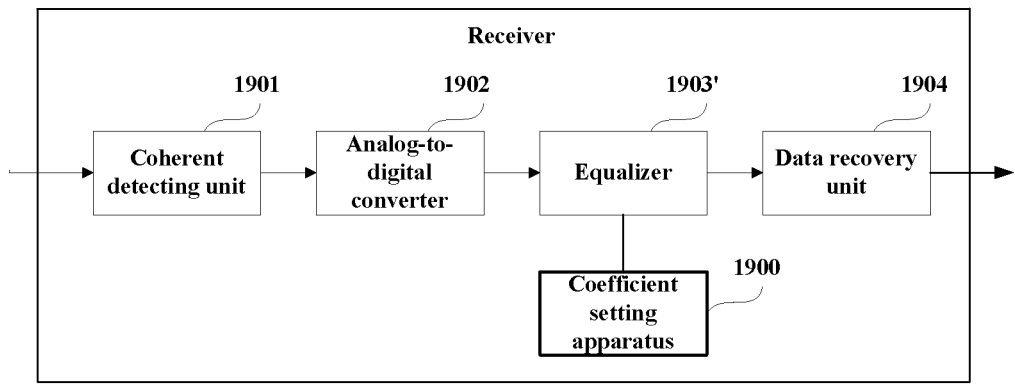
FIG. 20 is another schematic diagram of the structure of the receiver of Embodiment 8 of the present invention.
Figure 21:
FIG. 21 is a schematic diagram of the structure of the communication system of Embodiment 9 of the present invention.

In another embodiment, any existing equalizer, such as the butterfly filter shown in FIG. 2, may be used as the adaptive equalizer in the equalizer 1903. However, the coefficient determining apparatus of the above embodiment is used in setting the initial tap coefficient of the equalizer, and its structure may be realized by embodiments 2 and 3, the contents of which are incorporated herein, and shall not be described any further. As shown in FIG. 20, the equalizer may be realized by using any one of the existing results.

In still another embodiment, the receiver may further comprise the synchronizer as described in Embodiment 5, or the frequency difference compensator as described in Embodiment 6, or the frequency difference estimator as described in Embodiment 7, for use by the receiver in further processing the received signals by using the related information, which shall not be described here any further.

Embodiment 9

An embodiment of the present invention provides a communication system, comprising a transmitter 2101 and a receiver 2102; wherein the receiver is one as described in Embodiment 8, the contents of which are incorporated herein, and shall not be described any further.

The transmitter may be one as described in Embodiment 1, the contents of which are incorporated herein, and shall not be described any further.

Figure 22:
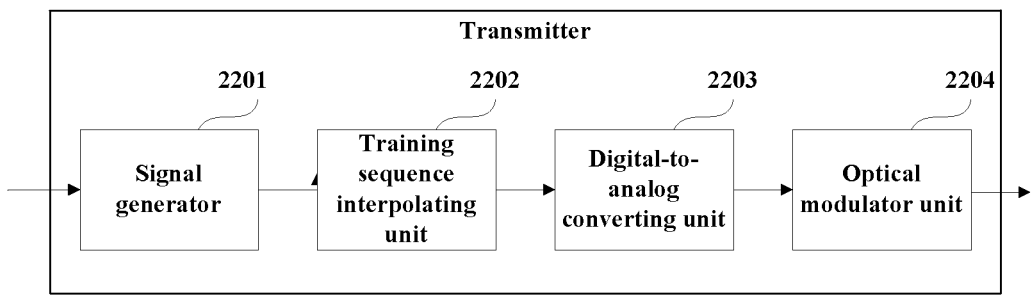
FIG. 22 is a schematic diagram of the structure of the transmitter of Embodiment 9 of the present invention.

FIG. 22 is a schematic diagram of the structure of the transmitter 2101 of Embodiment 9 of the present invention. As shown in FIG. 22, the transmitter 2101 comprises: a signal generator 2201, a digital-to-analog converting unit 2203 and an optical modulator unit 2204; wherein, the signal generator 2201 generates digital signals according to transmitted data, and a training sequence interpolating unit 2202 interpolates the training sequence as described in the above embodiments into the generated digital signals. The digital-to-analog converting unit 2203 performs digital-to-analog conversion on the digital signals. The optical modulator unit 2204 modulates light by taking the signals converted by the digital-to-analog converting unit as modulation signals.

In this embodiment, the training sequence inserting unit 2202 is equivalent to the sixth processor in FIG. 3, and inserts a training sequence into the generated data signals. The digital-to-analog converting unit 2203 and the optical modulator unit 2204 are equivalent to the sender in FIG. 3. Furthermore, a signal generator 2201 may be included and configured to generate data signals. All the above components may be realized by existing structures and functions, and the embodiment of the present invention is not limited thereto.

For the implementation of the present invention containing the above embodiments, following supplements are further disclosed.

Supplement 1. A coefficient determining apparatus, comprising:

a synchronizer configured to find a position of a training sequence from signals containing the training sequence received by a transmitter; and a first processor configured to set an initial tap coefficient of an equalizer according to the received signals and the training sequence;

wherein in each polarization state, the training sequence comprises n pairs of training symbols, in the n pairs of training symbols, the training symbols of the same pair being identical, the training symbols of the different pair being different, a cyclic prefix and a cyclic postfix being respectively inserted before and after each pair of training symbols, and n being an integer greater than 1.

Supplement 2. The apparatus according to supplement 1, wherein the training sequence further satisfies one or more of the following conditions:

there is a guard interval between the training sequence and payload data;

training symbols of different pairs have low correlation;

data belonging to training symbols of different pairs but positioned at the same frequency point in two polarization states are uncorrelated;

the training symbols of the training sequence are selected from a constant amplitude zero auto correlation sequence family; and the lengths of the training symbols of the training sequence are prime numbers.

Supplement 3. The apparatus according to supplement 1 or 2, wherein the synchronizer comprises:

a first correlation calculator configured to calculate, according to a length $N_f$ of the training symbols, the number of the training symbols and the lengths of the cyclic prefix and cyclic postfix, correlation values of $N_f$ sampling values before and $N_f$ sampling values after n sections of sampling values with a length of 2 $N_f$ in each polarization state starting from each sampling point;

a first modulus squarer configured to calculate a square of the moduli of the correlation values;

a first weighting averager configured to perform weighted average on a predefined sampling point serial number by using the square of the moduli of the correlation values in two polarization states, so as to obtain a starting position of the training sequence; wherein the predefined sampling point serial number refers to a sampling point serial number of the square of the moduli of the correlation values α times greater than a maximum square of the moduli of the correlation value, the range of α being between (n−1)/n and 1; and a second processor configured to determine, according to the starting position, the length $N_f$ of the training symbols and the lengths of the cyclic prefix and cyclic postfix, a position of the training sequence in the received signals.

Supplement 4. The apparatus according to any one of supplements 1-3, wherein the apparatus further comprises: a frequency difference compensator configured to estimate and compensate for a frequency difference between the received data signals;

and the first processor is further configured to set the initial tap coefficient of the equalizer according to the training sequence and the data signals compensated by the frequency difference compensator with respect to frequency difference.

Supplement 5. The apparatus according to supplement 4, wherein the frequency difference compensator comprises:

a first frequency difference estimator configured to calculate a first frequency difference by using a correlation value corresponding to the starting position of the training sequence, the length of the training symbols and a sampling time interval;

a first frequency difference compensator configured to perform first frequency difference compensation on the received data signals by using the first frequency difference;

a first converter configured to convert the time domain signals to which the training sequence corresponds into a frequency domain;

a first power calculator configured to calculate the power of the training sequence at each frequency point;

a second frequency difference estimator configured to calculate a second frequency difference by using the calculated power, positions of frequency point padded with data and positions of frequency point padded with zero in the frequency spectrum of the training sequence; and a second frequency difference compensator configured to, according to the second frequency difference, perform second frequency difference compensation on the signals on which the first frequency difference compensation has been performed.

Supplement 6. An equalizer, comprising:

a third processor configured to determine an initial tap coefficient of the equalizer, the third processor being the coefficient determining apparatus as supplemented in any one of supplements 1-5; and a fourth processor configured to update a tap coefficient by using the initial tap coefficient determined by the third processor or by using the initial tap coefficient and other training sequences distributed in a certain proportion in the data signals transmitted by a transmitter, and perform equalization on received signals.

Supplement 7. A synchronizer, comprising:

a second correlation calculator configured to calculate, according to signals containing a training sequence, a length $N_f$ of training symbols of the training sequence, the number of the training symbols and the lengths of a cyclic prefix and a cyclic postfix inserted before and after the training symbols, correlation values of $N_f$ sampling values before and $N_f$ sampling values after n sections of sampling values with a length of 2 $N_f$ in each polarization state starting from each sampling point; wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1;

a second modulus squarer configured to calculate a square of the moduli of the correlation values;

a second weighting averager configured to perform weighted average on a predefined sampling point serial number by using the square of the moduli of the correlation values in two polarization states, so as to obtain a starting position of the training sequence; wherein the predefined sampling point serial number refers to a sampling point serial number of the square of the moduli of the correlation values α times greater than a maximum square of the moduli of the correlation value, the range of α being between (n−1)/n and 1; and a fifth processor configured to determine, according to the starting position, the length of the training symbols and the lengths of the cyclic prefix and cyclic postfix, a position of the training sequence in the data signals.

Supplement 8. A frequency difference compensator, comprising:

a third frequency difference estimator configured to calculate a first frequency difference by using a correlation value corresponding to a starting position of the training sequence in received signals containing the training sequence, a length $N_f$ of training symbols of the training sequence and a sampling time interval; wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1;

a third frequency difference compensator configured to perform first frequency difference compensation on the received data signals by using the first frequency difference;

a third converter configured to convert the time domain signals to which the training sequence corresponds into a frequency domain;

a second power calculator configured to calculate the power of the training sequence at each frequency point;

a fourth frequency difference estimator configured to calculate a second frequency difference by using the calculated power, a position of a frequency point padded with data and a position of a frequency point padded with zero in the frequency spectrum of the training sequence; and a fourth frequency difference compensator configured to, according to the second frequency difference, perform second frequency difference compensation on the signals on which the first frequency difference compensation has been performed.

Supplement 9. A frequency difference estimator, comprising:

a fourth frequency difference estimator configured to calculate a first frequency difference by using a correlation value corresponding to a starting position of the training sequence, a length of training symbols and a sampling time interval;

a fourth converter configured to convert the time domain signals to which the training sequence corresponds into a frequency domain;

a third power calculator configured to calculate the power of the training sequence at each frequency point; and a fifth frequency difference estimator configured to calculate a second frequency difference according to the calculated power, positions of frequency point padded with data and positions of frequency point padded with zero in the frequency spectrum of the training sequence.

Supplement 10. A receiver, comprising the coefficient determining apparatus as described in any one of supplements 1-5, or comprising the equalizer as described in supplement 6, or comprising the synchronizer as described in supplement 7, or comprising the frequency difference compensator as described in supplement 9.

Supplement 11. A transmitter, comprising:

a sixth processor configured to insert a training sequence into payload data; and a sender configured to send payload data containing the training sequence to a receiver;

wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1.

Supplement 12. The transmitter according to supplement 11, wherein the training sequence further satisfies one or more of the following conditions:

there is a guard interval between the training sequence and payload data;

training symbols of different pairs have low correlation;

data belonging to training symbols of different pairs but positioned at the same frequency point in two polarization states are uncorrelated;

the training symbols of the training sequence are selected from a constant amplitude zero auto correlation sequence family; and the lengths of the training symbols of the training sequence are prime numbers.

Supplement 13. A coefficient determining method, comprising:

finding a position of a training sequence from signals containing the training sequence received by a transmitter; and setting an initial tap coefficient of an equalizer according to the received signals and the training sequence;

wherein in each polarization state, the training sequence comprises n pairs of training symbols, in the n pairs of training symbols, the training symbols of the same pair being identical, the training symbols of the different pair being different, a cyclic prefix and a cyclic postfix being respectively inserted before and after each pair of training symbols, and n being an integer greater than 1.

Supplement 14. The method according to supplement 13, wherein the training sequence further satisfies one or more of the following conditions:

there is a guard interval between the training sequence and payload data;

training symbols of different pairs have low correlation;

data belonging to training symbols of different pairs but positioned at the same frequency point in two polarization states are not correlated;

the training symbols of the training sequence are selected from a constant amplitude zero auto correlation sequence family; and the lengths of the training symbols of the training sequence are prime numbers.

Supplement 15. The method according to supplement 13 or 14, wherein the finding the position of the training sequence in the data signals comprises:

calculating correlation values of $N_f$ sampling values before and $N_f$ sampling values after n sections of sampling values with a length of $2 N_f$ in each polarization state starting from each sampling point, according to a length $N_f$ of the training symbols, the number of the training symbols and the lengths of the cyclic prefix and cyclic postfix;

calculating a square of the moduli of the correlation values;

performing weighted average on a predefined sampling point serial number by using the square of the moduli of the correlation values in two polarization states, so as to obtain a starting position of the training sequence; wherein the predefined sampling point serial number refers to a sampling point serial number of the square of the moduli of the correlation values α times greater than a maximum square of the moduli of the correlation value, the range of α being between $(n-1)/n$ and 1; and determining a position of the training sequence in the received signals, according to the starting position and the length of the training sequence.

Supplement 16. The method according to any one of supplements 13-15, wherein before setting the initial tap coefficient of the equalizer, the method further comprises:

estimating and compensating for a frequency difference;

and the initial tap coefficient of the equalizer is set according to the compensated data signals and the training sequence.

Supplement 17. The method according to supplement 16, wherein the estimating and compensating for a frequency difference comprises:

calculating a first frequency difference by using a correlation value corresponding to the starting position of the training sequence, the length of the training symbols and a sampling time interval;

performing first frequency difference compensation on the received data signals by using the first frequency difference;

converting the time domain signals to which the training sequence corresponds into a frequency domain;

calculating the power of the training sequence at each frequency point after the first frequency difference compensation;

calculating a second frequency difference according to the calculated power, positions of frequency points padded with data and positions of frequency points padded with zero in the frequency spectrum of the training sequence; and performing second frequency difference compensation on the signals on which the first frequency difference compensation has been performed, according to the second frequency difference.

Supplement 18. The method according to supplement 17, wherein the setting an initial tap coefficient of the equalizer according to the compensated data signals and the training sequence comprises:

converting the signals with frequency difference being compensated into a frequency domain;

calculating coefficients at the frequency domain by using the frequency difference compensated signals and the training sequence; and converting the coefficients at the frequency domain to obtain the initial tap coefficient of the equalizer at the time domain.

Supplement 19. An equalization method, comprising:

determining an initial tap coefficient of an equalizer by using the method as described any one of supplements 13-18; and updating a tap coefficient by using the initial tap coefficient or by using the initial tap coefficient and other training sequences distributed in a certain proportion in the data signals transmitted by a transmitter, and performing equalization on received signals.

Supplement 20. An synchronization method, comprising:

calculating correlation values of $N_f$ sampling values before and $N_f$ sampling values after n sections of sampling values with a length of 2 $N_f$ in each polarization state starting from each sampling point, according to signals containing a training sequence, a length $N_f$ of training symbols of the training sequence, the number of the training symbols and the lengths of a cyclic prefix and a cyclic postfix inserted before and after the training symbols; wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1;

calculating a square of the moduli of the correlation values;

performing weighted average on a predefined sampling point serial number by using the square of the moduli of the correlation values in two polarization states, so as to obtain a starting position of the training sequence; wherein the predefined sampling point serial number refers to a sampling point serial number of the square of the moduli of the correlation values $\alpha$ times greater than a maximum square of the moduli of the correlation value, $\alpha$ greater than $(n-1)/n$ and less than 1; and determining a position of the training sequence in the data signals, according to the starting position and the length of the training sequence.

Supplement 21. A frequency difference compensation method, comprising:

calculating a first frequency difference by using a correlation value corresponding to a starting position of the training sequence in received signals containing the training sequence, a length $N_f$ of training symbols and a sampling time interval; wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1;

performing first frequency difference compensation on the data signals by using the first frequency difference;

converting the time domain signals to which the training sequence corresponds into a frequency domain;

calculating the power of the training sequence at each frequency point after the first frequency difference compensation;

calculating a second frequency difference according to the calculated power, positions of frequency point padded with data and positions of frequency point padded with zero in the frequency spectrum of the training sequence; and performing second frequency difference compensation on the signals on which the first frequency difference compensation has been performed, according to the second frequency difference.

Supplement 22. A frequency difference estimation method, comprising:

calculating a first frequency difference by using a correlation value corresponding to the starting position of a training sequence, the length of the training sequence and a sampling time interval;

converting the time domain signals to which the training sequence corresponds into a frequency domain;

calculating the power of the training sequence at each frequency point; and calculating a second frequency difference according to the calculated power, positions of frequency points padded with data and positions of frequency points padded with zero in the frequency spectrum of the training sequence.

Supplement 23. A data transmission method, comprising:
inserting a training sequence into payload data; and
sending payload data containing the training sequence to a receiver;

wherein in each polarization state, the training sequence comprises n pairs of training symbols, in the n pairs of training symbols, the training symbols of the same pair being identical, and the training symbols of different pairs being different, a cyclic prefix and a cyclic postfix being respectively inserted before and after each pair of training symbols, and n being an integer greater than 1.

Supplement 24. The method according to supplement 23, wherein the training sequence further satisfies one or more of the following conditions:

there is a guard interval between the training sequence and payload data;

training symbols of different pairs have low correlation; and data belonging to training symbols of different pairs but positioned at the same frequency point in two polarization states are uncorrelated.

Supplement 25. The method according to supplement 23 or 24, wherein the training symbols of the training sequence are selected from a constant amplitude zero auto correlation sequence family.

Supplement 26. The method according to supplement 25, wherein the lengths of the training symbol are prime numbers.

Supplement 27. A communication system, comprising a transmitter and a receiver; wherein, the transmitter is one as described in supplement 11 or 12, and the receiver is one as described in supplement 10.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

The invention claimed is:

1. A coefficient determining apparatus, comprising:
   a synchronizer configured to find a position of a training sequence from signals containing the training sequence received by a transmitter; and
   a first processor configured to set an initial value of each of tap coefficients of an equalizer according to the received signals and the training sequence;
   wherein in horizontal polarization state and vertical polarization state, the training sequence comprises n pairs of training symbols, in the n pairs of training symbols, the training symbols within a pair being identical, a training symbols of one pair and a training symbol of another pair being different, a cyclic prefix and a cyclic postfix being respectively inserted before and after each pair of training symbols, and n being an integer greater than 1;
   wherein the synchronizer comprises:
   a first correlation calculator configured to calculate, according to a length $N_f$ of the training symbols, the number of the training symbols and the lengths of the cyclic prefix and cyclic postfix, one correlation value of $N_f$ sampling values before and $N_f$ sampling values after n sections of sampling values with a length of 2 $N_f$ in horizontal polarization state starting from each sampling point and one correlation value of $N_f$ sampling values before and $N_f$ sampling values after n sections of sampling values with a length of 2 $N_f$ in vertical polarization state starting from each sampling point;
   a first modulus squarer configured to calculate a square of the moduli of the correlation values:
   a first weighting averager configured to perform weighted average on a predefined serial numbers of the sampling points by using the square of the moduli of the correlation values in two polarization states, to obtain a starting position of the training sequence; wherein the predefined serial numbers of the sampling points refers to serial numbers of the sampling points of the square of the moduli of the correlation values α times greater than a maximum square of the moduli of the correlation value, the range of α being between (n−1)/n and 1; and
   a second processor configured to determine, according to the starting position, the length $N_f$ of the training symbols and the lengths of the cyclic prefix and cyclic postfix, a position of the training sequence in the received signals.

2. The apparatus according to claim 1, wherein the training sequence further satisfies one or more of the following conditions:
   there is a guard interval between the training sequence and payload data;
   training symbols of different pairs have low correlation;
   data belonging to training symbols of different pairs but positioned at the same frequency point in two polarization states are uncorrelated;
   the training symbols of the training sequence are selected from a constant amplitude zero auto correlation sequence family; and
   the lengths of the training symbols of the training sequence are prime numbers.

3. The apparatus according to claim 1, wherein the apparatus further comprises:
   a frequency difference compensator configured to estimate and compensate for a frequency difference between the received data signals;
   and the first processor is further configured to set the initial tap coefficient of the equalizer according to the training sequence and the data signals compensated by the frequency difference compensator with respect to frequency difference.

4. The apparatus according to claim 3, wherein the frequency difference compensator comprises:
   a first frequency difference estimator configured to calculate a first frequency difference by using a correlation value at the starting position of the training sequence, the length of the training sequence and a sampling time interval;
   a first frequency difference compensator configured to perform first frequency difference compensation on the received data signals by using the first frequency difference;
   a first converter configured to convert the received signals in time domain after the first frequency difference compensation into frequency domain;
   a first power calculator configured to calculate the power values of the training sequence at each frequency point;
   a second frequency difference estimator configured to calculate a second frequency difference by using the calculated power values, positions of frequency points padded with data and positions of frequency points padded with zero in the frequency spectrum of the training sequence; and
   a second frequency difference compensator configured to, according to the second frequency difference, perform second frequency difference compensation on the signals on which the first frequency difference compensation has been performed.

5. A synchronizer, comprising:
   a correlation calculator configured to calculate, according to signals including a training sequence, a length $N_f$ of training symbols of the training sequence, the number of the training symbols and the lengths of a cyclic prefix and a cyclic postfix inserted before and after the training symbols, one correlation values of $N_f$ sampling values before and $N_f$ sampling values after n sections of sampling values with a length of 2 $N_f$ in horizontal polarization state starting from each sampling point and one correlation value of $N_f$ sampling values before and $N_f$ sampling values after n sections of sampling values with a length of $2^N f$ in vertical polarization state starting from each sampling point; wherein in horizontal polarization state and vertical polarization state, the training sequence comprises n pairs of training symbols, in the n pairs of training symbols, the training symbols within a pair being identical, and a training symbol of one pair and a training symbol of another pair being different, a cyclic prefix and a cyclic postfix being respectively inserted before and after each pair of training symbols, and n being an integer greater than 1;
   a modulus squarer configured to calculate a square of the moduli of the correlation values;
   a weighting averager configured to perform weighted average on a predefined serial numbers of the sampling points by using the square of the moduli of the correlation values in two polarization states, to obtain a starting position of the training sequence; wherein the predefined serial numbers of the sampling points refers to serial numbers of the sampling points of the square of the moduli of the correlation values α times greater than a maximum square of the moduli of the correlation value, the range of α being between (n−1)/n and 1;

a processor configured to determine, according to the starting position, the length of the training symbols and the lengths of the cyclic prefix and cyclic postfix, a position of the training sequence in the data signals.

6. A frequency difference compensator, comprising:

a frequency difference estimator configured to calculate a first frequency difference by using a correlation value at a starting position of the training sequence in received signals containing the training sequence, a length $N_f$ of training symbols of the training sequence and a sampling time interval; wherein in horizontal polarization state and vertical polarization state, the training sequence comprises n pairs of training symbols, in the n pairs of training symbols, the training symbols within a pair being identical, and a training symbol of one pair and a training symbol of another pair being different, a cyclic prefix and a cyclic postfix being respectively inserted before and after each pair of training symbols, and n being an integer greater than 1;

a frequency difference compensator configured to perform first frequency difference compensation on the received data signals by using the first frequency difference;

a converter configured to convert the received signals in time domain after the first frequency difference compensation into frequency domain;

a power calculator configured to calculate the power values of the training sequence at each frequency point;

a frequency difference estimator configured to calculate a second frequency difference by using the calculated power values, a position of a frequency point padded with data and positions of frequency point padded with zero in the frequency spectrum of the training sequence; and a frequency difference compensator configured to, according to the second frequency difference, perform second frequency difference compensation on the signals on which the first frequency difference compensation has been performed.

\* \* \* \* \*

UNITED STATES PATENT AND TRADEMARK OFFICE
CERTIFICATE OF CORRECTION

PATENT NO. : 9,106,339 B2  
APPLICATION NO. : 14/026351  
DATED : August 11, 2015  
INVENTOR(S) : Meng Yan et al.

Page 1 of 1

It is certified that error appears in the above-identified patent and that said Letters Patent is hereby corrected as shown below:

In the claims,

Claim 1, Column 29, Line 21

Delete "symbols" and insert --symbol--, therefor.

Claim 1, Column 29, Line 38

Delete "values:" and insert --values;--, therefor.

Claim 5, Column 30, Line 44

Delete "values" and insert --value--, therefor.

Claim 5, Column 30, Line 50

Delete "$2^N f$" and insert --$2\ N_f$--, therefor.

Claim 5, Column 31, Line 4

Delete "1;" and insert --1; and--, therefor.

Signed and Sealed this  
First Day of December, 2015

Michelle K. Lee  
*Director of the United States Patent and Trademark Office*